(12) United States Patent
Arjunan

(10) Patent No.: US 7,223,828 B2
(45) Date of Patent: May 29, 2007

(54) BRANCHED DIENE-MODIFIED CRYSTALLINE POLYPROPYLENE TERPOLYMERS

(75) Inventor: Palanisamy Arjunan, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 341 days.

(21) Appl. No.: 10/717,264

(22) Filed: Nov. 19, 2003

(65) Prior Publication Data

US 2004/0110909 A1 Jun. 10, 2004

Related U.S. Application Data

(60) Provisional application No. 60/442,718, filed on Jan. 27, 2003, provisional application No. 60/431,088, filed on Dec. 5, 2002.

(51) Int. Cl.
*C08F 236/20* (2006.01)
(52) U.S. Cl. ............... 526/336; 526/337; 526/339; 526/348
(58) Field of Classification Search ............... 526/336, 526/337, 339, 348
See application file for complete search history.

(56) References Cited

U.S. PATENT DOCUMENTS

| 4,987,193 | A | * | 1/1991 | Gotoh ................. 525/313 |
| 5,504,171 | A | | 4/1996 | Etherton et al. ......... 526/336 |
| 5,514,761 | A | | 5/1996 | Etherton et al. ......... 526/144 |
| 5,635,573 | A | | 6/1997 | Harrington et al. ...... 526/170 |
| 5,670,595 | A | | 9/1997 | Meka et al. ............ 526/336 |
| 6,225,432 | B1 | | 5/2001 | Weng et al. ............ 526/351 |
| 6,809,168 | B2 | * | 10/2004 | Agarwal et al. ......... 526/336 |
| 2002/0013440 | A1 | | 1/2002 | Agarwal et al. ......... 526/335 |

FOREIGN PATENT DOCUMENTS

| EP | 0667359 | 8/1995 |
| EP | 0718324 | 6/1996 |
| EP | 0806436 | 11/1997 |
| EP | 0942017 | 9/1999 |
| EP | 1008607 | 6/2000 |
| EP | 1195391 | 4/2002 |
| JP | 6-25357 | 2/1994 |
| WO | WO98/49229 | 11/1998 |
| WO | WO99/11680 | 3/1999 |
| WO | WO00/06621 | 2/2000 |
| WO | WO01/46273 | 6/2001 |
| WO | WO02/50145 | 6/2002 |
| WO | WO02/90399 | 11/2002 |

OTHER PUBLICATIONS

"Functional Olefin Copolymers: Uniform Architectures of Propene/7-Methyl-1,6-Octadiene Copolymers by ATR-FTIR Spectroscopy Control of Monomer Composition", Hackmann et al., Macromolecules, American Society, Easton, US, vol. 33, No. 5, Mar. 7, 2000, pp. 1524-1529, (Germany).

"Zirconocene-MAO Catalyzed Homo- and Copolymerizations of Linear Asymmetrically Substituted Dienes with Propene: A Novel Strategy of Functional (co)poly($\alpha$-olefin)s", M. Hackmann et al., Macromol. Chem. Phys., pp. 1511-1517, 1998, (Germany).

"Copolymerizations of Olefins and Dienes with Homogeneous and Heterogeneous Catalysts", Lee et al., Eur. Polym. J., vol. 33(4), pp. 447-451, 1997, (Great Britain).

"Copolymerization of Propene-Nonconjugated Dienes: Derivatization Through Hydroboration and Epoxydation", J.P. Dassaud et al., Polym. Adv. Technol., 4(7), pp. 457-464, 1993, (France).

* cited by examiner

Primary Examiner—Roberto Rabago

(57) ABSTRACT

Certain specific embodiments of the invention will now be discussed. For example, a process of preparing a polymer composition that includes a branched crystalline diene-modified polypropylene random terpolymer is described, which process includes: contacting a metallocene catalyst compound with a polymerization medium that includes at least a propylene monomer, a first diene monomer, and a second diene monomer; and conducting polymerization of the monomers in the presence of the metallocene catalyst compound for a time sufficient to provide a branched crystalline diene-modified polypropylene random terpolymer that includes monomeric units derived from each of the monomers, and having from 0.0 wt % to 2.0 wt % ethylene and a heat of fusion of 30 J/g or more.

23 Claims, No Drawings

BRANCHED DIENE-MODIFIED CRYSTALLINE POLYPROPYLENE TERPOLYMERS

CROSS REFERENCE TO RELATED APPLICATIONS

This application claims the benefit of Provisional Application Nos. 60/442,718 filed Jan. 27, 2003 and 60/431,088, filed Dec. 5, 2002.

BACKGROUND OF INVENTION

1. Field of Invention

The present invention relates to branched crystalline polypropylene (BCPP) compositions and methods for the preparation of branched crystalline polypropylene compositions, which preferably include polypropylene terpolymers having at least two different types of diene units.

2. Description of Related Art

Various processes have been proposed for making polypropylene compositions. Such different processes will typically have different variables and parameters, including different monomer compositions, solvents, additives, reaction conditions, catalyst systems, etc. The properties and characteristics of the final product have a great deal to do with the process variables and parameters that are selected, and it has been recognized that small modifications in such variables and parameters can create significant differences in not only the final product, e.g., polymer properties, but also in the effectiveness of the overall process, e.g., catalyst productivity, presence or absence of gel. See, for example, background references that include U.S. Pat. Nos. 5,514,761, 5,635,573, 6,225,432, U.S. application Ser. No. 2002/013440 A1, WO 98/49229 A, WO 00/06621 A, WO 01/46273 A, WO 02/090399 A, WO 02/50145 A, EP 0 667 359 A, EP 0 718 324 A, EP 0 806 436 A, EP 0 942 017 A, EP 1 008 607 A, EP 1 195 391 A, JP Abstract 06 025357 A, and Hackman et al., *Functional Olefin Copolymers: Uniform Architectures of Propene/7-methyl-1,6-octadiene Copolymers by ATR-FTIR Spectroscopy Control of Monomer Composition,* 33 MACROMOLECULES 5, 1524-1529 (2000).

An ongoing need exists for processes that provide polypropylene with good processability and high melt strength, which is desirable for applications such as thermoforming, foaming, and blow molding. Poor melt strength of polypropylenes shows up as excess sag in sheet extrusion, rapid thinning of walls in parts thermoformed in the melt phase, low draw-down ratios in extrusion coating, poor bubble formation in extrusion foam materials, and relative weakness in large-part blow molding. Thus, it would be highly desirable to produce a polypropylene having enhanced melt strength as well as commercially valuable processability.

Furthermore, a need exists for a polypropylene that, when formed in the reactor system, has desirable properties, e.g., branching, without undesirable side-effects, e.g., gel formation; and that after polymerization can be subjected to crosslinking preferably without substantial loss of desirable polymer properties.

SUMMARY OF INVENTION

Described herein are branched crystalline polypropylenes and processes for preparing branched crystalline polypropylenes.

Described below are processes of preparing a polymer composition that includes a branched crystalline diene-modified polypropylene random terpolymer, which processes include: contacting a metallocene catalyst compound with a polymerization medium that includes at least a propylene monomer, a first diene monomer, and a second diene monomer, wherein the first diene monomer and the second diene monomer are different non-conjugated dienes, each having 5 or more carbon atoms; and conducting polymerization of the monomers in the presence of the metallocene catalyst compound for a time sufficient to provide a branched crystalline diene-modified polypropylene random terpolymer that includes monomeric units derived from each of the monomers, and having from 0.0 wt % to 2.0 wt % ethylene and a heat of fusion of 30 J/g or more.

Also described are processes of preparing a polymer composition that includes a branched crystalline diene-modified polypropylene random terpolymer, which processes preferably include: contacting a metallocene catalyst compound with a polymerization medium that includes at least a propylene monomer, an α, internal non-conjugated diene monomer, and an α, ω non-conjugated diene monomer; and conducting polymerization of the monomers in the presence of the metallocene catalyst compound for a time sufficient to provide a branched crystalline diene-modified polypropylene random terpolymer that includes monomeric units derived from each of the monomers, and having from 0.0 wt % to 2.0 wt % ethylene and a heat of fusion of 30 J/g or more.

Also described are polymer compositions that include a branched crystalline diene-modified polypropylene random terpolymer having propylene units; first diene units; second diene units; from 0.0 wt % to 2.0 wt % ethylene units; and a heat of fusion of 30 J/g or more, wherein the first diene units and the second diene units are derived from different non-conjugated diene monomers, each having 5 or more carbon atoms.

DETAILED DESCRIPTION

Various specific embodiments, versions and examples of the invention will now be described, including preferred embodiments and definitions that are adopted herein for purposes of understanding the claimed invention. It is understood, however, that for purposes of assessing infringement, the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

Definitions and Properties

Certain terms and properties, some of which appear in the claims, will now be defined, as used in this patent and for purposes of interpreting the scope of the claims. To the extent a term used in a claim is not defined below, it should be given the broadest definition persons in the pertinent art have given that term as reflected in printed publications and issued patents.

The term "monomer" as used herein can refer to the monomer used to form the polymer, i.e., the unreacted chemical compound in the form prior to polymerization, and can also refer to the monomer after it has been incorporated into the polymer, sometimes also referred to as a "monomeric unit," which by virtue of the polymerization reaction, typically has fewer hydrogen atoms than it does prior to the polymerization reaction. Different monomers are discussed herein, including propylene monomers and different diene monomers.

The term "copolymer" is defined as a polymer that includes two or more monomers (i.e., monomeric units), and is preferably made using a polymerization medium that includes the two or more monomers in their unreacted or prepolymerization state.

The term "terpolymer" is defined as a polymer that includes three or more monomers (monomeric units), and is preferably made using a polymerization medium that includes the three or more monomers in their prepolymerization state. As used herein, a terpolymer can be a type of copolymer.

The term "random copolymer" is defined as a copolymer (including a terpolymer) in which the distribution of the monomer units (also sometimes called monomer residues) is consistent with a substantially random statistical copolymerization of the monomers.

Certain polymers are described herein as being "crosslinked" or "crosslinkable." The term "crosslink" is defined to have the broad meaning consistent with usage of persons skilled in the art, as reflected in patents and printed publications; and a material described herein as "crosslinked" is one that has been subjected to any type of crosslinking procedure, including chemical and heat-induced crosslinking, such as conventional curing; irradiation; or any method of chain extension via residual side-chain unsaturation sites. Preferably, a material is considered "crosslinked" if it has been subjected to some form of crosslinking for 5 minutes or more.

The term "cross-linkable" is defined as a polymer capable of being crosslinked to a detectable extent, i.e., a measurable degree, preferably after the polymerization reaction is completed and the polymer has been removed from the polymerization reactor, e.g., in granular form, or even after it has been separated from any solvent/diluent. Preferably, a "cross-linkable" polymer herein is one whose melt flow rate is capable of being lowered by at least 10% when subjected to a conventional crosslinking procedure, e.g., curing to an elevated temperature for 5 minutes or more; or more preferably at least 30%; or most preferably at least 50%.

The term "diene" is defined as a hydrocarbon compound that has two unsaturation sites, i.e., a compound having two double bonds connecting carbon atoms. Thus, a diene is not a triene (with three double bonds) nor any other polyene. Depending on the context, the term "diene monomer" in this patent refers broadly to either a diene monomer prior to polymerization, e.g. forming part of the polymerization medium, or a diene monomer after polymerization has begun (also referred to as a diene monomer unit or a diene monomeric unit).

The term "non-conjugated diene" refers to a diene that is not "conjugated," meaning that at least one of the carbon atoms in the polymer backbone has single bonds but no double or triple bond. Thus, any butadiene is not considered herein to be a "non-conjugated diene".

The term "$\alpha, \omega$ diene" refers to a diene having a double bond at each end of the polymer chain, e.g., 1,7-octadiene or 1,9-decadiene. Preferably, as discussed below, the $\alpha, \omega$ diene is non-conjugated diene.

The term "internal diene" refers to a diene in which at least one of the double bonds is not at the end of the polymer chain.

The term "$\alpha$, internal diene" is a more specific type of internal diene, in which one of the double bonds is at the end of the polymer and another double bond is not at the end of the polymer chain, e.g., 1,6-octadiene.

The term "$\alpha$, internal, non-conjugated diene" is an $\alpha$, internal diene that is nonconjugated.

As used herein, the term "solvent" is defined broadly, to refer to any liquid medium in which any of the polymerization reactions described herein can take place, but not including any liquid material that is polymerized, such as monomers. The term "solvent" includes diluents, which are preferably inert, and specifically includes the solvents and diluents disclosed in Weng et al., U.S. Pat. No. 6,225,432.

The definition of the term "reactor system" used herein is any vessel, structure, enclosure, or combinations thereof in which a polymerization reaction is capable of taking place, and also includes any vessel or combination of vessels in which the various polymerization processes described herein take place, in whole or in part. A reactor system can thus be or include a single reactor vessel, or multiple reactor vessels, e.g., series or parallel reactors.

The term "metallocene" is defined broadly as a compound represented by the formula $Cp_mMR_nXq$. The symbol "Cp" refers to either a cyclopentadienyl ring, which may be substituted or unsubstituted, or a cyclopentadienyl ring derivative, such as an indenyl ring, which may also be substituted or unsubstituted. As discussed in greater detail below, a preferred metallocene compound includes two cyclopentadienyl rings, is sometimes referred to as a "bis-cyclopentadienyl" metallocene, and preferred cyclopentadienyl derivatives are bis-indenyl and bis-tetrahydroindenyl metallocene compounds. The symbol "M" refers to a Group 4, 5, or 6 transition metal, for example, titanium, zirconium, hafnium, vanadium, niobium, tantalum, chromium, molybdenum and tungsten. The symbol "R" in the general formula above refers to a hydrocarbyl group, e.g., methyl, or a hydrocarboxy group, each of which may have from one to 20 carbon atoms. The symbol "X" refers to a halogen, e.g., chlorine, bromine, or fluorine. The letter "m" can represent 1, 2, or 3; the letter "n" can represent 0, 1, 2, or 3; and the letter "q" can represent 0, 1, 2, or 3. The sum of m+n+q should be equal to the oxidation state of the transition metal. Examples of metallocene compounds are found in U.S. Pat. Nos. 4,530,914; 4,542,199; 4,769,910; 4,808,561; 4,871,705; 4,892,851; 4,933,403; 4,937,299; 5,017,714; 5,057,475; 5,120,867; 5,132,381; 5,155,080; 5,198,401; 5,278,119; 5,304,614; 5,324,800; 5,350,723; 5,391,790; 6,376,410; 6,376,412; 6,380,120; 6,376,409; 6,380,122; and 6,376,413. The portions of those patents describing the metallocene compounds and the ingredients and procedures for making and using such compounds are incorporated herein by reference. As discussed in greater detail below, preferred metallocene catalyst compounds are subsets of the general metallocene category, particularly those that provide the desired combinations of properties, as well as those that have demonstrated remarkably high productivities.

An important feature of one or more specific embodiments of the invention relates to the formation of crystalline polymers that are "branched," at least to some degree. Various procedures have been published, and either are or will be available to identify whether a polymer is branched or not, and a polymer is regarded herein as being "branched"

to the extent branching can be detected, regardless of the method or equipment used for such detection. Preferably, the crystalline polypropylene is branched to a degree that it can be measured quantitatively, and even more preferably expressed in terms of a branching index. A well known branching index for monodisperse polymers is used herein, referred to herein as "Branching Index," also known as g', which is defined as the ratio of intrinsic viscosities of the branched to linear molecules, i.e., $g'=[\eta]_{br}/[\eta]_{lin}$. The term "$\eta$" stands for intrinsic solution viscosity. The term "$[\eta]_{br}$" is the intrinsic viscosity for the branched polymer molecule, and the term "$[\eta]_{lin}$" is that for a linear polymer molecule of equal molecular weight. For polydisperse samples the Branching Index is an average branching index, $<g'>_{avg}$, defined as:

$$<g'>_{avg} = \frac{[\eta]_{branched}}{[\eta]_{linear}} = \frac{\sum_{i=1}^{N} C_i \times [\eta]_i}{\sum_{i=1}^{N} C_i \times [k \times M_i^\alpha]}$$

Here, the index i refers to a given polymer fraction, $M_i$ is the molecular weight of that fraction as measured by light scattering, $[\eta]_i$ is the intrinsic viscosity of that fraction measured by viscometry, $C_i$ is the concentration of that fraction, and "k" and "a" are the Mark Houwink coefficients for a linear polymer of the same chemical species. These quantities are measured by a GPC setup with online light scattering, viscometer, and concentration detectors. A polymer sample having branching will have intrinsic viscosity that deviates from that of a linear polymer. If a polymer sample is linear, the branching index, g', will be 1.0 (+/−0.02). If a polymer sample is branched, the average branching index will be less than 1. A lower branching index indicates more branching. In practice, average deviation levels can be calculated from GPC-3D method involving three different detectors on line—LALLS, Viscometry, DRI—to measure, respectively, the molecular weights, viscosity, and concentration of the polymer solution. First, the GPC-LALLS data is used to measure molecular weight averages ($M_w$, $M_z$). The respective intrinsic viscosity of the polymer solution, "$\eta$", is obtained from the viscometer data while the concentration at each data point is provided by the DRI technique. Finally the "$\eta$" is related to absolute molecular weight. Weight-average values of g' are to be calculated from the data points that fall in the range of from the characteristic $M_w$ of the polymer examined to the upper limit of 2,000,000 Daltons. For any case in which some values of $M_w$ are below 100,000 Daltons, the weight average is calculated using only those points between 100,000 Daltons and 2,000,000 Daltons. To calculate the branching index for polypropylene that includes at least some ethylene monomer units, the following equations should be used: g'=1.18w, where "w" is the weight fraction of ethylene.

Melting and crystallization temperatures of the polymers (Tm and Tc) are measured on a DuPont DSC-912 with thin molded film samples, scanning at 10° C./min. The melting temperatures described herein are obtained from the second melt.

As used herein, the term "polypropylene" means a polymer made of at least 50% propylene units, preferably at least 70% propylene units, more preferably at least 80% propylene units, even more preferably at least 90% propylene units or 95% propylene units. In one or more specific embodiments described herein, a "polypropylene" referenced herein may have 65 wt % or more propylene; or 80 wt % or more propylene; or 90 wt % or more propylene; or 97 wt % or more propylene.

A polypropylene polymer made according to the processes described herein is considered distinguishable from polymers that are sometimes described in the scientific or patent literature as "polypropylene" but which contain undesirably high levels of ethylene. It has been recognized that even relatively small amounts of ethylene monomer can have a significant or substantial effect on final polymer properties. Accordingly, as used herein, the term "polypropylene" refers to a polypropylene polymer with no more than 3.0 wt % ethylene; or no more than 2.5 wt % ethylene. Preferably, the polypropylenes described herein have no more than 2.0 wt % ethylene; or no more than 1.5 wt % ethylene; or no more than 1.0 wt % ethylene.

As used herein, the term "linear polypropylene" means a polypropylene having no detectable branching (quantitatively or qualitatively), preferably a Branching Index of 1.0 (+/−0.02).

As used herein, the term "branched polypropylene" (BCPP) means a polypropylene that is branched (detected quantitatively or qualitatively), and preferably has a Branching Index, based on measured data, of less than 1.0 (+/−0.02).

As used herein, the term "polymerization medium" includes at least the monomers that form the polypropylene polymer and optionally a solvent. The term "polymerization medium" does not include a catalyst system, e.g., catalyst compounds or activators. After polymerization has begun, the polymerization medium may also include products of polymerization, e.g. macromers and other polymers.

As used herein, the term "slurry polymerization" means a polymerization process in which particulate, solid polymer is formed in a liquid or vapor polymerization medium.

As used herein, the term "bulk process" means a polymerization process in which the polymerization medium consists entirely of or consists essentially of monomers and any products of polymerization that has taken place, e.g. macromers and polymers, but does not include solvent.

The amount of vinyl chain ends is determined by $^1$H NMR as set forth in the literature, specifically in Weng et al., Macromol. Rapid Commun. 2000, 21, 1103-07.

The terms "molecular weight" ($M_n$ and $M_w$) and "polydispersity" (Mw/Mn) are intended to broadly encompass molecular weights that are obtained, measured and/or calculated using any published procedure, except to the extent a particular procedure is specified herein. Preferably, the molecular weights are measured in accordance with the procedure described in the article by T. Sun et al., cited above.

The "melt flow rate" (MFR) is measured in accordance with ASTM D-1238 at 230° C. and 2.16 kg load.

A property that can be used to characterize the branched crystalline polypropylenes described herein is its heat of fusion. As used herein, the "heat of fusion" is measured using Differential Scanning Calorimetry (DSC), using the ASTM E-794-95 procedure. About 4 mg to about 10 mg of a sheet of the polymer pressed at approximately 200° C. to 230° C. is removed with a punch die and is annealed at room temperature for 48 hours. At the end of this period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak of the sample which is typically at a maximum peak at about 30° C. to about 175° C. and occurs between the temperatures of about 0° C. and about 200° C. The thermal output is measured in Joules as a measure of the heat of fusion. The melting point is recorded as the temperature of the greatest heat absorption within the range of melting temperature of the sample.

The term "isotatic" as used herein is defined as referring to a polymer sequence in which more than 50% of adjacent monomers having groups of atoms that are not part of the backbone structure are located either all above or all below the atoms in the backbone chain, when the latter are all in one plane.

The term "syndiotactic" as used herein is defined as referring to a polymer sequence in which more than 50% of adjacent monomers which have groups of atoms that are not part of the backbone structure are located in some symmetrical fashion above and below the atoms in the backbone chain, when the latter are all in one plane.

The branched polypropylene polymers described herein are characterized as being "crystalline." The crystallinity of a polymer can be expressed in terms of percent crystallinity, usually with respect to some reference or benchmark crystallinity. The crystallinities of the polypropylenes described herein are expressed as a percentage of the crystallinity of isotactic polypropylene homopolymer, which is defined herein to be 190 J/g. Thus, in one or more specific embodiments, crystalline polypropylene compositions described herein have a crystallinity of from 30% of the crystallinity of an isotactic polypropylene homopolymer, preferably from 40% to 50%. Preferably, heat of fusion is used to actually measure crystallinity for purposes of comparing to isotactic polypropylene homopolymer. Thus, for example, based on a heat of fusion for a highly crystalline polypropylene homopolymer of 190 J/g, a branched crystalline polypropylene having a heat of fusion of 95 J/g will have a crystallinity of 50%.

The term "melting point" for a material as used herein is defined as the highest peak among principal and secondary melting peaks as determined by Differential Scanning Calorimetry (DSC), discussed above.

As used herein, the term "productivity" is defined as the weight of polymer produced per weight of the catalyst used in the polymerization process per 1 hour of polymerization time (e.g., grams polymer/gram catalyst/hr).

Specific Embodiments of Processes

Certain specific embodiments of the invention will now be discussed. For example, a process of preparing a polymer composition that includes a branched crystalline diene-modified polypropylene random terpolymer is described, which process includes: contacting a metallocene catalyst compound with a polymerization medium that includes at least a propylene monomer, a first diene monomer, and a second diene monomer, wherein the first diene monomer and the second diene monomer are different non-conjugated dienes, each having 5 or more carbon atoms; and conducting polymerization of the monomers in the presence of the metallocene catalyst compound for a time sufficient to provide a branched crystalline diene-modified polypropylene random terpolymer that includes monomeric units derived from each of the monomers, and having from 0.0 wt % to 2.0 wt % ethylene and a heat of fusion of 30 J/g or more.

Also described are processes of preparing a polymer composition that includes a branched crystalline diene-modified polypropylene random terpolymer, which processes preferably include: contacting a metallocene catalyst compound with a polymerization medium that includes at least a propylene monomer, an $\alpha$, internal non-conjugated diene monomer, and an $\alpha$, $\omega$ non-conjugated diene monomer; and conducting polymerization of the monomers in the presence of the metallocene catalyst compound for a time sufficient to provide a branched crystalline diene-modified polypropylene random terpolymer that includes monomeric units derived from each of the monomers, and having from 0.0 wt % to 2.0 wt % ethylene and a heat of fusion of 30 J/g or more.

Preferably, in one or more of the processes described herein, the first diene monomer is an $\alpha$, internal diene.

Preferably, in one or more of the processes described herein, the second diene monomer is an $\alpha$, $\omega$ diene.

More preferably, in one or more of the processes described herein, the first diene monomer is an $\alpha$, internal non-conjugated diene monomer; and the second diene monomer is an $\alpha$, $\omega$ non-conjugated diene monomer.

In one or more of the processes described herein, either the first diene monomer or the second diene monomer can have an internal double bond comprising a di-substituted vinyl group or a tri-substituted vinyl group.

In one or more of the processes described herein, either the first diene monomer or the second diene monomer can have an internal double bond comprising a di-substituted vinyl group or a tri-substituted vinyl group having one or more methyl group substituents.

In one or more of the processes described herein, the first diene monomer is preferably an $\alpha$, internal non-conjugated diene monomer having an internal double bond comprising a tri-substituted vinyl group having two methyl group substituents.

In one or more of the processes described herein, the second diene monomer is can be an $\alpha$, $\omega$ diene comprising unsubstituted 1,4-pentadiene; 1,5-hexadiene; 1,6-heptadiene; 1,7-octadiene; 1,8-nonadiene; or 1,9-decadiene.

In one or more of the processes described herein, either the first diene monomer or the second diene monomer can include substituted 1,4-pentadiene; 1,5-hexadiene; 1,6-heptadiene; 1,7-octadiene; 1,8-nonadiene; or 1,9-decadiene.

In one or more of the processes described herein, the second diene monomer can be 2-methyl-1,5-hexadiene; 2-methyl-1,6-heptadiene; or 2-methyl-1,7-octadiene.

In one or more of the processes described herein, the first diene monomer can include 2-methyl-1,5-hexadiene or 7-methyl-1,6-octadiene.

In one or more of the processes described herein, the amount of the first diene monomer can be greater than the amount of the second diene monomer.

In one or more of the processes described herein, the first diene monomer can be, for example, an $\alpha$, internal non-conjugated diene monomer; the second diene monomer can be an $\alpha$, $\omega$ non-conjugated diene monomer; and the amount of the first diene monomer can be greater than the amount of the second diene monomer.

In one or more of the processes described herein, the polymerization medium can include 50 mol % or more propylene monomers, 10 mol % or less $\alpha$, internal non-conjugated diene monomers, and 1 mol % or less $\alpha$, $\omega$ non-conjugated diene monomers.

In one or more of the processes described herein, the metallocene catalyst compound can be or include a substituted or unsubstituted silyl-bridged or ethylene-bridged bis-indenyl metallocene.

In one or more of the processes described herein, the metallocene compound preferably includes a bridged metallocene compound having at least two indenyl rings or derivatives of indenyl rings, each ring being substituted at the 2 position. More preferably, the metallocene compound comprises a bridged metallocene compound having at least two indenyl rings or derivatives of indenyl rings, each ring being substituted at the 2 and 4 positions.

Specifically, in one or more of the processes described herein, the metallocene compound includes supported dimethylsilylbis(2-methyl-4-phenyl-1-indenyl)zirconium dimethyl.

In one or more of the processes described herein, the metallocene includes a dimethylanilinium tetrakis (perfluorophyl) boron activator. Alternatively, the supported metallocene can include a methylalutninoxane activator.

In a specific embodiment, in one or more of the processes described herein, the metallocene compound is represented by the formula:

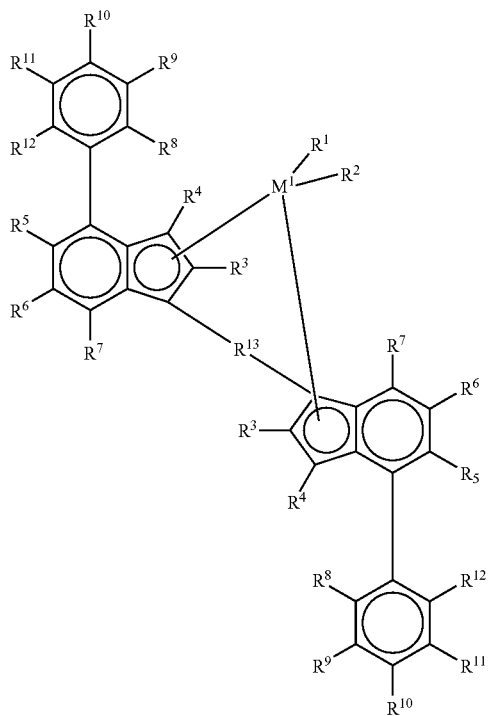

(I)

wherein:
$M^1$ is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_2$-$C_{40}$ alkenyl group, a $C_7$-$C_{40}$ arylalkyl group, a $C_7$-$C_{40}$ alkylaryl group, a $C_8$-$C_{40}$ arylalkenyl group, an OH group or a halogen atom; $R^1$ and $R^2$ may also be joined together to form an alkanediyl group or a conjugated $C_{4-40}$ diene ligand which is coordinated to $M^1$ in a metallocyclopentene fashion; $R^1$ and $R^2$ may also be identical or different conjugated dienes, optionally substituted with one or more hydrocarbyl, tri(hydrocarbyl)silyl groups or hydrocarbyl, tri(hydrocarbyl)silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

Each $R^3$ is identical or different from the other $R^3$ and is each a hydrogen atom, a halogen atom, a $C_1$-$C_{10}$ alkyl group which may be halogenated, a $C_6$-$C_{10}$ aryl group which may be halogenated, a $C_2$-$C_{10}$ alkenyl group, a $C_7$-$C_{40}$-arylalkyl group, a $C_7$-$C_{40}$ alkylaryl group, a $C_8$-$C_{40}$ arylalkenyl group, a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group;

$R^4$ to $R^7$ are identical or different and are hydrogen, or are as defined for $R^3$ or two or more adjacent radicals $R^5$ to $R^7$ together with the atoms connecting them form one or more rings;

$R^{13}$ is

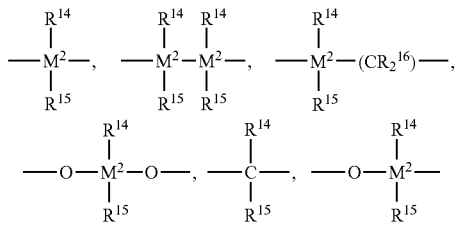

—B($R^{14}$)—, ⁻Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

or, $R^{13}$ is represented by the formula:

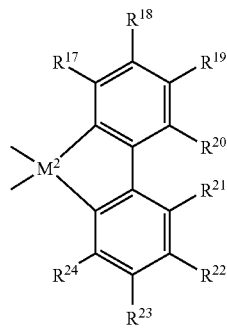

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings;

$M^2$ is one or more carbons, silicon, germanium or tin; and $R^8$, $R^9$, $R^{10}$, $R^{11}$ and $R^{12}$ are identical or different and have the meanings stated for $R^4$ to $R^7$.

In another specific embodiment, in one or more of the processes described herein, the metallocene compound is represented by the formula:

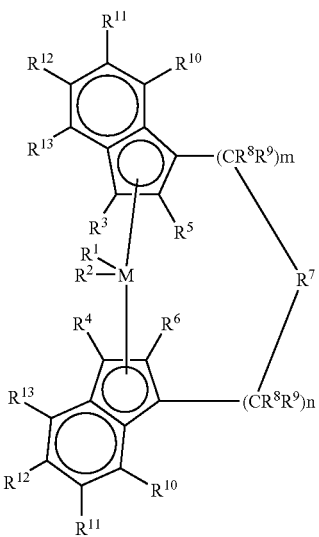

wherein: M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, or a halogen atom, or a conjugated diene which is optionally substituted with one or more hydrocarbyl, tri(hydrocarbyl)silyl groups or hydrocarbyl, tri(hydrocarbyl)silylhydrocarbyl groups, said diene having up to 30 atoms not counting hydrogen;

$R^3$ and $R^4$ are defined the same as are $R^1$ and $R^2$;

$R^5$ and $R^6$ are identical or different, and are one of a hydrogen atom, a halogen atom, a $C_1$-$C_{10}$ alkyl group, which may be halogenated, a $C_6$-$C_{10}$ aryl group, which may be halogenated, a C2-$C_{10}$ alkenyl group, a $C_7$-$C_{40}$ arylalkyl group, a $C_7$-$C_{40}$ alkylaryl group, a $C_8$-$C_{40}$ arylalkenyl group, a —$NR'_2$, —SR', —OR', —$OSiR'_3$ or —$PR'_2$ radical, wherein: R' is one of a halogen atom, a $C_1$-C10 alicyl group, or a $C_6$-$C_{10}$ aryl group;

R7 is

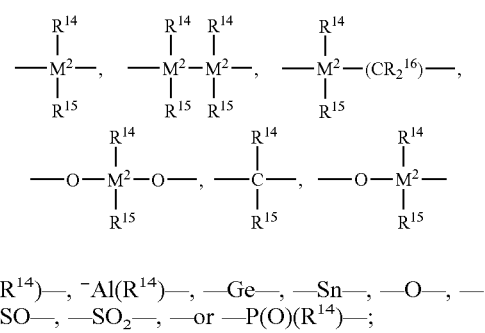

—B($R^{14}$)—, ⁻Al($R^{14}$)—, —Ge—, —Sn—, —O—, —S—, —SO—, —$SO_2$—, —or —P(O)($R^{14}$)—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_9$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon, silicon, germanium or tin;

$R^8$ and $R^9$ are $R^8$ and $R^9$, are identical or different, and have the meanings stated for $R^5$ and $R^6$;

$R^{10}$, $R^{11}$, $R^{12}$ and $R^{13}$ are identical or different and have the meanings stated for $R^5$ and $R^6$; wherein at least one of $R^{13}$ and $R^{10}$ are identical or different, and are one of a hydrogen atom, a halogen atom, a C1-$C_{10}$ alkyl group, which may be halogenated, a $C_6$-$C_{10}$ aryl group, which may be halogenated, a $C_2$-$C_{10}$ alkenyl group, a $C_7$-C.arylalkyl group, a $C_7$-$C_{40}$ alkylaryl group, a $C_8$-$C_{40}$ arylalkenyl group, a —$NR''_2$, —SR'', —OR'', —$OSiR''_3$ or —$PR''_2$ radical, wherein: R'' is one of a halogen atom, a $C_1$-$C_{10}$ alkyl group, or a $C_6$-$C_{10}$ aryl group; and m and n are identical or different and are zero or 1, m plus n is zero 1 or 2.

In one or more of the processes described herein, the polymerization medium is substantially gel-free following formation of the polypropylene terpolymer. Further, one or more of the processes described herein includes crosslinking the polypropylene terpolymer.

In one or more of the processes described herein, the polymerization medium has less than 70 volume percent diluent. Alternatively, the polymerization medium can have less than 50 volume percent diluent; or less then 30 volume percent diluent.

In one or more of the processes described herein, the final crystalline polypropylene terpolymer is isotactic or syndiotactic.

In one or more of the processes described herein, the metallocene catalyst compound is combined with the monomers in the absence of hydrogen or in the presence of hydrogen in an amount of up to 1.0 mole % hydrogen in the reactor.

In one or more of the processes described herein, the heat of fusion of the crystalline polypropylene is 50 J/g or more; or 70 J/g or more; or 75 J/g or more; or 100 J/g or more.

As discussed above, the polypropylene terpolymer described herein is preferably branched. More specifically, in one or more of the processes described herein, the branched crystalline polypropylene has a Branching Index of 0.98 or less; or 0.95 or less; or 0.90 or less; or 0.80 or less.

SPECIFIC EMBODIMENTS OF COMPOSITIONS

As mentioned above, an aspect of this invention relates to a polymer composition. In one or more specific embodiments, this invention is directed to a polymer composition that includes a branched crystalline diene-modified polypropylene random terpolymer having propylene units; first diene units; second diene units; from 0.0 wt % to 2.0 wt % ethylene units; and a heat of fusion of 30 J/g or more, wherein the first diene units and the second diene units are derived from different non-conjugated diene monomers, each having 5 or more carbon atoms.

In one or more of the polymer compositions described herein, the random polypropylene terpolymer comprises at least 30% and no more than 95% propylene units; at least 5% and no more than 65% first diene units; at least 0.001% and no more than 2.00% second diene units; and from 0.0 mol % to 3.0 mol % ethylene units.

One or more of the polymer compositions described herein include a first diene unit derived from an α, internal non-conjugated diene monomer and/or a second diene unit derived from an α, ω non-conjugated diene monomer.

In one or more of the polymer compositions described herein, the first diene monomer is an α, internal non-conjugated diene monomer that is present in the polypropylene terpolymer in an amount of from 0.0005 mol % to 10 mol %.

In one or more of the polymer compositions described herein, the first diene monomer is an α, internal non-conjugated diene monomer that is present in the polypropylene terpolymer in an amount of from 0.005 mol % to 1 mol %.

In one or more of the polymer compositions described herein, the first diene monomer is 2-methyl-1,5-hexadiene or an a, internal non-conjugated diene monomer selected from the group consisting of 7-methyl-1, 6-octadiene.

In one or more of the polymer compositions described herein, the branched final crystalline polypropylene has a crystallization temperature (Tc) of 50° C. or more; or 75° C. or more; or 100° C. or more; or 110° C. or more. In one or more of the polymer compositions described herein, the branched crystalline polypropylene has a crystallization temperature (Tc) ranging from 50° C. to 115° C.

In one or more of the polymer compositions described herein, the branched crystalline polypropylene has a melting point (Tm) of 75° C. or more; or 100° C. or more; or 125° C. or more; or 150° C. or more; or 160° C. or more. In one or more of the polymer compositions described herein, the branched crystalline polypropylene has a melting point (Tm) of from 75° C. to 160° C.

In one or more of the polymer compositions described herein, the branched crystalline polypropylene has a melt flow rate of 0.01 or more; or 0.1 or more; or 0.5 or more; or 0.7 or more; or 1.0 or more; or 1.5 or more.

ADDITIONAL SPECIFIC EMBODIMENTS

Embodiments of the invention include combining in a polymerization zone propylene monomers, one or more alpha, internal non-conjugated diene monomers (also referred to as α, internal-non-conjugated diene monomers or AIN dienes); one or more α, ω internal non-conjugated diene monomers (also referred to as alpha omega non-conjugated dienes or AON dienes); and a metallocene catalyst system under suitable polymerization conditions to produce a cross-linkable branched (BCPP) polypropylene random terpolymer composition.

Each α, internal non-conjugated diene monomer preferably has a hydrocarbon structure with at least two unsaturated bonds in which at least one of the unsaturated bonds is readily polymerized by the metallocene catalyst system and in which at least another of the unsaturated bonds is not readily polymerized by the metallocene catalyst system.

The α, internal diene monomers may be linear, cyclic, and/or multicyclic, including fused and non-fused cyclic dienes. Preferably, the α, internal non-conjugated diene monomers az-c linear. Also, preferably, the α, internal non-conjugated diene monomers include α, internal non-conjugated dienes in which the internal double bond is a vinylidene group or a tn-substituted unsaruration site. Examples of preferred α, internal nan-conjugated dienes include 7-methyl-1,6-octadiene (which has a tri-substituted unsaturation site); dicyclopentadiene vinylnorbornene; ethylidiene norbornene; 4-vinylcyclohexene; and 4-vinyl cyciopentene. Also available as a diene monomer in the present invention is 2-methyl-1,5 hexadiene (which has a vinylidene group).

The α, ω dienes may also be linear, cyclic, and/or multicyclic, including fused and non-fused cyclic dienes. Examples of α, ω dienes include 1,7-octadiene, 1,9-decadiene, 1,13-tetradecadiene, 1,8-nonadiene, 1,10-undecadiene, 1,11-dodecadiene, 1,15-hexadecadiene, 1,17-octadecadiene; norbornadiene; 4-butenyl styrene; and divinylbenzene. A preferred α, ω diene is 1,9-decadiene.

Polymerization can be carried out in a solution, slurry, bulk, or gas phase process. If a solvent is used, any suitable solvent or diluent may be used, such as hexane, toluene, heptane, octane, pentane, propane, isobutane, cycloalkane, aromatics, and other hydrocarbon solvents. The polymerization medium preferably comprises 0.1 mol % or less α, ω dienes, preferably 0.03 mol % or less, more preferably 0.02 mol % or less α, ω dienes.

Polymerization may be conducted in a batch, a semi-batch, or a continuous mode, preferably in a continuous mode. Polymerization may be carried out in a single reactor or in multiple reactors. If multiple reactors are used, the reactors may be operated in series and/or in parallel.

The metallocene catalyst system may be introduced into the reaction zone as independent components in a solvent or diluent or as the combined product in a solvent or a diluent. Likewise, the monomers, in bulk or in solvent or diluent, can be introduced into the reaction zone as a separate feed, or may be combined with one or the other of the metallocene catalyst system components. Furthermore, the metallocene catalyst components can be suspended or dissolved in the monomers themselves and thereafter fed into the reaction zone.

It is further contemplated that the α, internal non-conjugated diene monomers form side chain unsaturation sites in the polypropylene main chain. It is contemplated that the α-double bond of the α, internal non-conjugated diene monomers is polymerized by the metallocene catalyst system at a rate comparable with propylene polymerizations while the internal double of the α, internal non-conjugated diene monomers is incapable of polymerization by the metallocene catalyst system at a rate comparable with the propylene polymerizations. It is further contemplated that the substituents of the internal double bond sterically hinder polymerization by the metallocene catalyst of the internal double bond. Preferably, the side chain unsaturation sites enable the polymer to be cross-linked through exposure to radiation, heat, or cross-linking agents (i.e. peroxides.) Cross-linking of the polymer through the side chain unsaturation sites derived from α, internal non-conjugated dienes provides H-type branching.

The BCPP polypropylene random copolymer is preferably cross-linkable, and may be cross-linked to increase the degree of branching. In addition, such cross-linkable BCPP polypropylene random copolymer may be cross-linked to counter-balance degradation of the polypropylene backbone due to chain scission cause by radiation, melt processing, and other processing steps or exposure to environmental conditions. The cross-linkable BCPP polypropylene random copolymer may be cross-linked in any form. For example, the cross-linkable BCPP polypropylene random copolymer may be irradiated in any form such as a fiber, fabric, molded article, powder, granule, pellet, film, etc. The cross-linkable BCPP polypropylene random copolymer may also be modified by typical grafting, hydrogenation, functionalizing, or other reactions well know to one skilled in the art.

In certain embodiments, the cross-linkable BCPP polypropylene random copolymer has a melting point 25° C. or above, preferably 70° C. or above, more preferably 130° C. or above.

Embodiments of the cross-linkable BCPP polypropylene random copolymer have increased melt strength in comparison to linear polypropylene. The cross-linkable BCPP polypropylene random copolymer compositions and blends with other polymers and/or materials may be advantageously used in radiation resistance articles, for example medical gowns and other medical garments and applications. The cross-linkable BCPP polypropylene random copolymer composition can also be used in various applications, such as thermoforming, foaming, blow molding, extrusion coating, melt blowing, fiber spinning, viscosity modifiers for lube oils, wax crystal modifiers for hydrocarbon fuels, plasticizers, functionalization of polypropylenes, processing aids, thermoplastic elastomers, impact modifiers, compatibilizers, surface modifiers, wettable polypropylenes, high density polypropylenes, elastic polypropylenes. The cross-linkable BCPP polypropylene random copolymer composition is well suited for thermoforming, foaming, blow molding, and other applications which require a melt strength higher than that of linear polypropylene. The cross-linkable BCPP polypropylene random copolymer composition and their blends with other polymers and/or materials may be used in any fabricated article, such as films, fibers, sheets, plaques, hoes, belts, tires, tapes, wovens, and other dimensional objects. Embodiments of the cross-linkable BCPP polypropylene random copolymer composition also have improved extensional viscosity (according to a Rheometric Scientific RMS-800 in parallel plate oscillatory shear mode at 180° C. from 0.1 to 400 rad/sec), improved shear thinning behavior, improved rigidity, crystallization behavior, recoverable compliance, and improved flex modulus in comparison to linear polypropylene. Thus, the cross-linkable BCPP polypropylene random copolymer composition has improved processability in comparison to linear polypropylene.

Catalyst Systems

In at least some of the embodiments described herein, it is preferred that the processes involve the use of a single catalyst compound only, as opposed to two or more catalyst compounds contacting the monomers. For one or more of the embodiments described herein, any type of metallocene can be used, provided the other qualifications, e.g., claim limitations, are observed. However, there are certain metallocenes that are preferred. Two different categories of metallocenes will now be described in greater detail. Those will be referred to as "first" and "second" metallocenes, but this does not imply any order of preference; and there may be some overlap between the first and second metallocenes.

As discussed below, an example of a preferred "first" metallocene compound is an alkyl bridged metallocene compound that has at least two indenyl rings or derivatives of indenyl rings, each preferably being substituted at the 4 and/or 7 positions. An example of a preferred "second" metallocene compound is a silyl bridged metallocene compound. The second metallocene is preferably capable of producing high molecular weight, high tacticity polypropylene polymers (when used alone, i.e., without any other catalyst). Preferred second metallocenes have at least two indenyl rings or substituted indenyl rings, each ring preferably being substituted at the 2 position, more preferably being substituted at the 2 and 4 positions. The 4-position substitution is preferably an aryl substituent that is yet further substituted as described below.

The chiral metallocenes may be used as a racemate for the preparation of highly isotactic polypropylene polymers and copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

The branched polypropylene polymer preferably has a weight average molecular weight (Mw) within a particular range. That range may have a lower limit of 30,000 Daltons, 50,000 Daltons, 70,000 Daltons, or 100,000 Daltons; and the range may have an upper limit of 2,000,000 Daltons, 1,000,000 Daltons, 750,000 Daltons, 500,000 Daltons, or 300,000 Daltons, with the weight average molecular weight ranging from any lower limit to any upper limit, depending on which claimed invention is being referenced.

First Metallocene Compound.

One or more embodiments of the first metallocene compound include an ethylene-bridged bis-cyclopentadienyl metallocene, more preferably an ethylene-bridged bis-indenyl metallocene. Particularly preferred ethylene-bridged bis-indenyl metallocenes are compounds of the general structure (B):

(B):

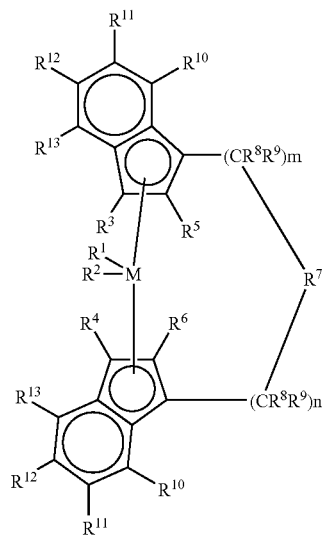

wherein: M is a metal of Group 4, 5, or 6 of the Periodic Table, for example titanium, zirconium, hafnium, vanadium, niobium, tantalum, chromium, molybdenum and tungsten, preferably, zirconium, hafnium and titanium, most preferably zirconium and hafnium;

$R^1$ and $R^2$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, or a halogen atom, or a conjugated diene which is optionally substituted with one or more hydrocarbyl, tri(hydrocarbyl)silyl groups or hydrocarbyl, tri(hydrocarbyl)silylhydrocarbyl groups, said diene having up to 30 atoms not counting hydrogen;

$R^3$ and $R^4$ are defined the same as are $R^1$ and $R^2$;

$R^5$ and $R^6$ are identical or different, and are one of a hydrogen atom, a halogen atom, a $C_1$-$C_{10}$ alkyl group, which may be halogenated, a $C_6$-$C_{10}$ aryl group, which may be halogenated, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, a $C_1$-$C_{10}$ alkyl group, or a $C_6$-$C_{10}$ aryl group;

R7 is

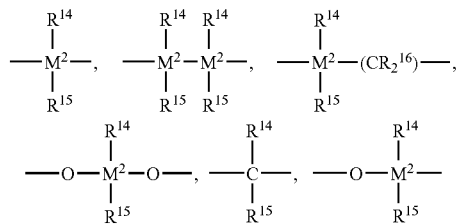

—$B(R^{14})$—, —$Al(R^{14})$—, —Ge—, —Sn—, —O—, —S—, —SO—, —$SO_2$—, —$N(R^{14})$—, —CO—, —$P(R^{14})$—, or —$P(O)(R^{14})$—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

$M^2$ is carbon, silicon, germanium or tin;

$R^8$ and $R^9$ are $R^8$ and $R^9$, are identical or different, and have the meanings stated for $R^5$ and $R^6$;

$R^{10}$, $R^{11}$, $R^{12}$ and $R^{13}$ are identical or different and have the meanings stated for $R^5$ and $R^6$; wherein at least one of $R^{13}$ and $R^{10}$ are identical or different, and are one of a hydrogen atom, a halogen atom, a $C_1$-$C_{10}$ alkyl group, which may be halogenated, a $C_6$-$C_{10}$ aryl group, which may be halogenated, a $C_2$-$C_{10}$ alkenyl group, a $C_7$-$C_{40}$ arylalkyl group, a $C_7$-$C_{40}$ alkylaryl group, a $C_8$-$C_{40}$ arylalkenyl group, a —$NR_2^{15}$, —$SR^{15}$, —$OR^{15}$, —$OSiR^{315}$ or —$PR_2^{15}$ radical, wherein: $R^{15}$ is one of a halogen atom, a $C_1$-$C_{10}$ alkyl group, or a $C_6$-$C_{10}$ aryl group; and m and n are identical or different and are zero, 1 or 2, m plus n is zero, 1 or 2, and Illustrative but non-limiting examples of some ethylene-bridged bis-indenyl metallocenes include:

1,2-Ethandiylbis(2-methyl-4,6-diisopropyl-1-indenyl)ZrCl₂;
1,2-Ethandiylbis(2-methyl-4,5-benzo-1-indenyl)ZrCl₂;
1,2-Ethandiylbis(2,4,7-trimethyl-1-indenyl)ZrCl₂;
1,2-Ethandiylbis(2-methyl-1-indenyl)ZrCl₂;
rac-1,2-ethylenebis(4,7-dimethyl-tetrahydroindenyl)]HfCl₂;
rac-1,2-ethylenebis(4,7-dimethyl-indenyl)]HfCl₂;
1,2-Ethandiylbis(2-methyl-4,6-diisopropyl-1-indenyl)HfCl₂;
1,2-Ethandiylbis(2-methyl-4,5-benzo-1-indenyl)HfCl₂;
1,2-Ethandiylbis(2,4,7-trimethyl-1-indenyl)HfCl₂;
1,2-Ethandiylbis(2-methyl-1-indenyl)ZrCl₂; and the like, including alkyl dichloride species.

Preferred ethylene-bridged bis-indenyl metallocenes and ethylene-bridged bis-tetrahydroindenyl metallocenes include rac-1,2-ethylenebis(4,7-dimethyl-tetrahydroindenyl)]hafnium dichloride and rac-1,2-ethylenebis(4,7-dimethyl-indenyl)]hafnium dichloride.

In at least one embodiment, the transition metal of the first metallocene compound is preferably hafnium. It is believed that polypropylene formed using hafnium metallocenes (hafnocenes) have increased amount of vinyl chain ends in comparison to polypropylene formed using metallocenes comprising other transition metals.

Second Metallocene Compound.

The second metallocene compound preferably includes a silyl-bridged bis-cyclopentadienyl metallocene, more preferably a silyl-bridged bis-indenyl metallocene, which may be substituted. Preferred embodiments of the second metallocene compounds are described in greater detail below. Alternatively, it is contemplated that the second metallocene may be one that is capable of producing syndiotactic, rather than isotactic polypropylene. Syndiotactic producing metallocenes are very well known in the art. For example, U.S. Pat. Nos. 6,184,326 and 4,892,851 describe such metallocenes in detail, along with methods for making them, and each such description is fully incorporated herein by reference. Common syndio-specific metallocenes are generally a combination of cyclopentadienyl and fluorenyl ligands, which may be substituted.

Particularly preferred bis-indenyl metallocenes are compounds of the general formula:

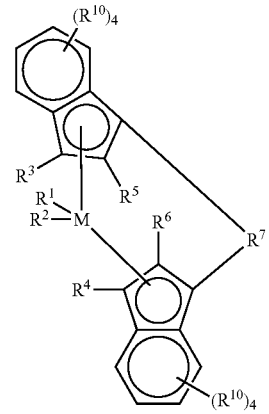

wherein: M is a metal of Group 4, 5, or 6 of the Periodic Table preferably, zirconium, hafnium and titanium, most preferably zirconium;

$R^1$ and $R^2$ are identical or different, preferably identical, and are one of a hydrogen atom, a $C_1$-$C_{10}$ alkyl group, preferably a $C_1$-$C_3$ alkyl group, a $C_1$-$C_{10}$ alkoxy group, preferably a $C_1$-$C_3$ alkoxy group, a $C_6$-$C_{10}$ aryl group, preferably a $C_6$-$C_8$ aryl group, a $C_6$-$C_{10}$ aryloxy group, preferably a $C_6$-$C_8$ aryloxy group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, or a halogen atom, preferably chlorine; or a conjugated diene which is optionally substituted with one or more hydrocarbyl, tri(hydrocarbyl) silyl groups or hydrocarbyl, tri(hydrocarbyl) silylhydrocarbyl groups, said diene having up to 30 atoms not counting hydrogen;

$R^5$ and $R^6$ are identical or different, preferably identical, are one of a hydrogen atom, a halogen atom, preferably a fluorine, chlorine or bromine atom, a $C_1$-$C_{10}$ alkyl group, preferably a $C_1$-$C_4$ alkyl group, which may be halogenated, a $C_6$-$C_{10}$ aryl group, which may be halogenated, preferably a $C_6$-$C_8$ aryl group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, a —$NR_2^{15}$, —$SR^{15}$, —$OR^{15}$, —$OSiR_3^{15}$ or —$PR_2^{15}$ radical, wherein: $R^{15}$ is one of a halogen atom, preferably a chlorine atom, a $C_1$-$C_{10}$ alkyl group, preferably a $C_1$-$C_3$ alkyl group, or a $C_6$-$C_{10}$ aryl group, preferably a $C_6$-$C_9$ aryl group;

$R^7$ is

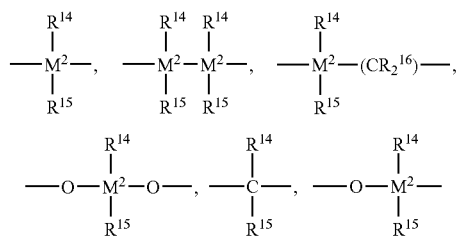

—$B(R^{14})$—, $^-Al(R^{14})$—, —Ge—, —Sn—, —O—, —S—, —SO—, —$SO_2$—, —$N(R^{14})$—, —CO—, —$P(R^{14})$—, or —$P(O)(R^{14})$—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring; preferably, $R^{14}$, $R^{15}$ and $R^{16}$ are identical and are a hydrogen atom, a halogen atom, a $C_1$-$C_4$ alkyl group, a $CF_3$ group, a $C_6$-$C_8$ aryl group, a $C_6$-$C_{10}$ fluoroaryl group, more preferably a pentafluorophenyl group, a $C_1$-$C_4$ alkoxy group, in particular a methoxy group, a $C_2$-$C_4$ alkenyl group, a $C_7$-$C_{10}$ arylalkyl group, a $C_8$-$C_{12}$ arylalkenyl group, or a $C_7$-$C_{14}$ alkylaryl group;

or, $R^7$ is represented by the formula:

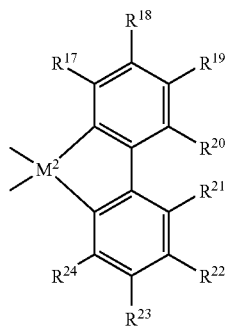

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; preferably, $R^{17}$ to $R^{24}$ are hydrogen;

$M^2$ is carbon, silicon, germanium or tin;

the radicals $R^3$, $R^4$, and $R^{10}$ are identical or different and have the meanings stated for $R^5$ and $R^6$, or two adjacent $R^{10}$ radicals are joined together to form a ring, preferably a ring containing from about 4-6 carbon atoms.

Particularly preferred second metallocenes are those of the formula:

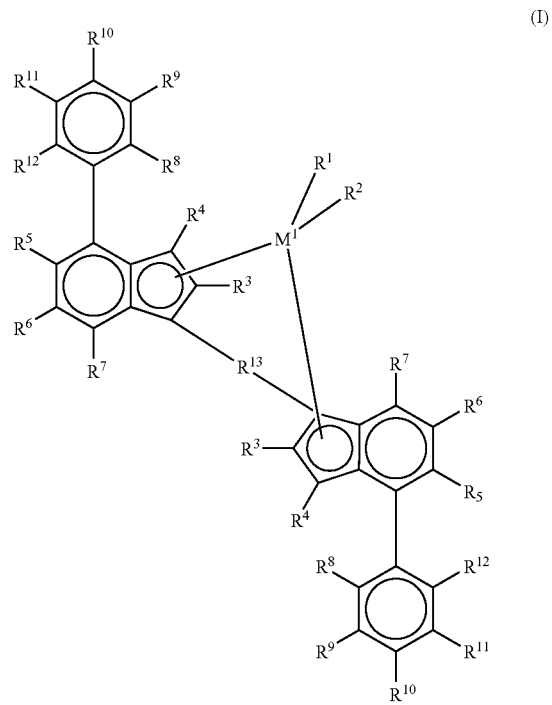

(I)

wherein: $M^1$ is selected from the group consisting of titanium, zirconium, hafnium, vanadium, niobium, tantalum, chromium, molybdenum and tungsten, preferably zirconium, hafnium or titanium, most preferably zirconium;

$R^1$ and $R^2$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_2$-$C_{40}$ alkenyl group, a $C_7$-$C_{40}$ arylalkyl group, a $C_7$-$C_{40}$ alkylaryl group, a $C_8$-$C_{40}$ arylalkenyl group, an OH group or a halogen atom; $R^1$ and $R^2$ may also be joined together to form an alkanediyl group or a conjugated $C_4$-$_{40}$ diene ligand which is coordinated to $M^1$ in a metallocyclopentene fashion; $R^1$ and $R^2$ may also be identical or different conjugated dienes, optionally substituted with one or more hydrocarbyl, tri(hydrocarbyl)silyl groups or hydrocarbyl, tri(hydrocarbyl)silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

preferably $R^1$ and $R^2$ are identical and are a $C_1$-$C_3$ alkyl or alkoxy group, a $C_6$-$C_8$ aryl or aryloxy group, a $C_2$-$C_4$ alkenyl group, a $C_7$-$C_{10}$ arylalkyl group, a $C_7$-$C_{12}$ alkylaryl group, or a halogen atom, preferably chlorine;

$R^3$ are identical or different and are each a hydrogen atom, a halogen atom, a $C_1$-$C_{10}$ alkyl group which may be halogenated, a $C_6$-$C_{10}$ aryl group which may be halogenated, a $C_2$-$C_{10}$ alkenyl group, a $C_7$-$C_{40}$-arylalkyl group, a $C_7$-$C_{40}$ alkylaryl group, a $C_8$-$C_{40}$ arylalkenyl group, a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group; preferably $R^3$ is not a hydrogen atom;

preferably each $R^3$ is identical and is a fluorine, chlorine or bromine, atom, a $C_1$-$C_4$ alkyl group which may be halogenated, a $C_6$-$C_8$ aryl group which may be halogenated, a —NR'$_2$, —SR', —OR', —OSiR'$_3$ or —PR'$_2$ radical, wherein R' is one of a chlorine atom, a $C_1$-$C_4$ alkyl group, or a $C_6$-$C_8$ aryl group;

$R^4$ to $R^7$ are identical or different and are hydrogen, or are as defined for $R^3$ or two or more adjacent radicals $R^5$ to $R^7$ together with the atoms connecting them form one or more rings, preferably a 6-membered ring, preferably 4-8 membered ring;

$R^{13}$ is

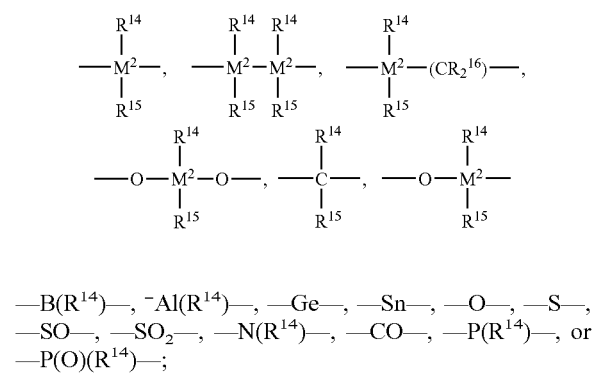

—B($R^{14}$)—, ⁻Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$-$C_4$ alkyl group, a $CF_3$ group, a $C_6$-$C_8$ aryl group, a $C_6$-$C_{10}$ fluoroaryl group, more preferably a pentafluorophenyl group, a $C_1$-$C_4$ alkoxy group, in particular a methoxy group, a $C_2$-$C_4$ alkenyl group, a $C_7$-$C_{10}$ arylalkyl group, a $C_8$-$C_{12}$ arylalkenyl group, or a $C_7$-$C_{14}$ alkylaryl group;

or, $R^{13}$ is represented by the formula:

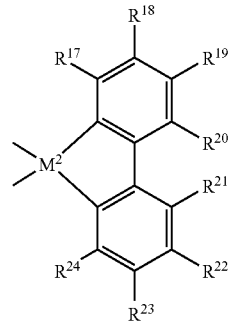

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; preferably, $R^{17}$ to $R^{24}$ are hydrogen;

$M^2$ is one or more carbons, silicon, germanium or tin, preferably silicon;

$R^{13}$ may also be an amidoborane-type radical such as is described in WO00/20426 (herein fully incorporated by reference);

$R^8$, $R^9$, $R^{10}$, $R^{11}$ and $R^{12}$ are identical or different and have the meanings stated for $R^4$ to $R^7$.

In at least one embodiment, the transition metal of the second metallocene compound is preferably zirconium. It is believed that polypropylene formed using zirconium metallocenes (zirconocenes) have increased catalyst activity in comparison to hafnocenes.

Preferred silyl-bridged bis-indenyl metallocenes of the second metallocene includes silyl-bridged bis-indenyl zirconocenes, such as the silyl-bridged bis-indenyl zirconocenes described above. A preferred silyl-bridged bis-indenyl zirconocene is dimethylsilylbis(2-methyl-4-phenyl indenyl)zirconium dichloride or dimethylsilylbis(2-methyl-4-phenyl indenyl)zirconium dimethyl.

Preferred compounds for use in this invention include metallocene catalyst compounds represented by the formula: $L_z(Cp)(Q)M'''X_n$ where:

Cp is a substituted or unsubstituted cyclopentadienyl ring, a substituted or unsubstituted indenyl ring or a substituted or unsubstituted fluoreneyl ring;

Q is a heteroatom containing group;

z is 0 or 1;

L is a bridging group connecting Cp to Q,

M is a Group 4, 5, or 6 transition metal;

m is 3, 4, 5 or 6;

X is a halogen or a substituted or unsubstituted hydrocarbyl group, a substituted or unsubstituted hydrocarboxy group, or a substituted or unsubstituted heteroatom containing group; and n is m minus 2.

In a preferred embodiment, z is 1, L is represented by the formula: RqSi— where each R is, independently, a substituted or unsubstituted $C_1$ to $C_{20}$ hydrocarbyl group and q is 1, 2, 3 or 4; and Q is a nitrogen containing group.

In a preferred embodiment, the metallocene catalyst compound is represented by the formula: $L_z(Cp)_2M'''X_n$ where:

each Cp is independently a substituted or unsubstituted cyclopentadienyl ring, a substituted or unsubstituted indenyl ring or a substituted or unsubstituted fluoreneyl ring;
z is 0 or 1;
L is a bridging group connecting Cp to Q,
M is a Group 4, 5, or 6 transition metal;
m is 3, 4, 5 or 6;
X is a halogen or a substituted or unsubstituted hydrocarbyl group, a substituted or unsubstituted hydrocarboxy group, or a substituted or unsubstituted heteroatom containing group; and
n is m minus 2.

In a preferred embodiment, z is 1, L is represented by the formula: RqSi— where each R is, independently, a substituted or unsubstituted $C_1$ to $C_{20}$ hydrocarbyl group and q is 1, 2, 3 or 4; and both Cp groups are indenyl rings substituted at the 2 and 4 positions.

In a preferred embodiment the metallocene catalyst compound comprises one or more of:
dimethylsiladiyl(2-methyl,4-[3',5'-di-tbutylphenyl]indenyl)$_2$ zirconium dichloride;
dimethylsiladiyl(2-ethyl,4-[3',5'-di-tbutylphenyl]indenyl)$_2$ zirconium dichloride;
dimethylsiladiyl(2-n-propyl,4-[3',5'-di-tbutylphenyl]indenyl)$_2$zirconium dichloride;
dimethylsiladiyl(2-iso-propyl,4-[3',5'-di-tbutylphenyl]indenyl)$_2$zirconium dichloride;
dimethylsiladiyl(2-n-butyl,4-[3',5'-di-tbutylphenyl]indenyl)$_2$ zirconium dichloride;
dimethylsiladiyl(2-iso-butyl,4-[3',5'-di-tbutylphenyl]indenyl)$_2$zirconium dichloride;
dimethylsiladiyl(2-sec-butyl,4-[3',5'-di-tbutylphenyl]indenyl)$_2$zirconium dichloride;
dimethylsiladiyl(2-tert-butyl,4-[3',5'-di-tbutylphenyl]indenyl)$_2$zirconium dichloride;
dimethylsiladiyl(2-methyl,4-[3',5'-di-tbutylphenyl]indenyl)$_2$ hafnium dichloride;
dimethylsiladiyl(2-ethyl,4-[3',5'-di-tbutylphenyl]indenyl)$_2$ hafnium dichloride;
dimethylsiladiyl(2-n-propyl,4-[3',5'-di-tbutylphenyl]indenyl)$_2$hafnium
dimethylsiladiyl(2-iso-propyl,4-[3',5'-di-tbutylphenyl]indenyl)$_2$hafnium dichloride;
dimethylsiladiyl(2-butyl,4-[3',5'-di-tbutylphenyl]indenyl)$_2$ hafnium dichloride;
9-silafluorendiyl(2-methyl,4-[3',5'-di-tbutylphenyl]indenyl)$_2$ zirconium dichloride;
9-silafluorendiyl(2-ethyl,4-[3',5'-di-tbutylphenyl]indenyl)$_2$ zirconium dichloride;
9-silafluorendiyl(2-n-propyl,4-[3',5'-di-tbutylphenyl]indenyl)$_2$zirconium dichloride;
9-silafluorendiyl(2-iso-propyl,4-[3',5'-di-tbutylphenyl]indenyl)$_2$zirconium dichloride;
9-silafluorendiyl(2-n-butyl,4-[3',5'-di-tbutylphenyl]indenyl)$_2$ zirconium dichloride;
9-silafluorendiyl(2-iso-butyl,4-[3',5'-di-tbutylphenyl]indenyl)$_2$zirconium dichloride;
9-silafluorendiyl(2-sec-butyl,4-[3',5'-di-tbutylphenyl]indenyl)$_2$zirconium dichloride;
9-silafluorendiyl(2-tert-butyl,4-[3',5'-di-tbutylphenyl]indenyl)$_2$zirconium dichloride;
9-silafluorendiyl(2-methyl,4-[3',5'-di-tbutylphenyl]indenyl)$_2$ hafnium dichloride;
9-silafluorendiyl(2-ethyl,4-[3',5'-di-tbutylphenyl]indenyl)$_2$ hafnium dichloride;
9-silafluorendiyl(2-n-propyl,4-[3',5'-di-tbutylphenyl]indenyl)$_2$hafnium dichloride;
9-silafluorendiyl(2-iso-propyl,4-[3',5'-di-tbutylphenyl]indenyl)$_2$hafnium dichloride;
9-silafluorendiyl(2-n-butyl,4-[3',5'-di-tbutylphenyl]indenyl)$_2$ hafnium dichloride;
9-silafluorendiyl(2-iso-butyl,4-[3',5'-di-tbutylphenyl]indenyl)$_2$hafnium dichloride;
9-silafluorendiyl(2-sec-butyl,4-[3',5'-di-tbutylphenyl]indenyl)$_2$hafnium dichloride;
9-silafluorendiyl(2-tert-butyl,4-[3',5'-di-tbutylphenyl]indenyl)$_2$hafnium dichloride;
dimethylsiladiyl(2-methyl,4-[3',5'-di-tbutylphenyl]indenyl)$_2$ zirconium dimethyl;
dimethylsiladiyl(2-ethyl,4-[3',5'-di-tbutylphenyl]indenyl)$_2$ zirconium dimethyl;
dimethylsiladiyl(2-n-propyl,4-[3',5'-di-tbutylphenyl]indenyl)$_2$zirconium dimethyl;
dimethylsiladiyl(2-iso-propyl,4-[3',5'-di-tbutylphenyl]indenyl)$_2$zirconium dimethyl;
dimethylsiladiyl(2-n-butyl,4-[3',5'-di-tbutylphenyl]indenyl)$_2$ zirconium dimethyl;
dimethylsiladiyl(2-iso-butyl,4-[3',5'-di-tbutylphenyl]indenyl)$_2$zirconium dimethyl;
dimethylsiladiyl(2-sec-butyl,4-[3',5'-di-tbutylphenyl]indenyl)$_2$zirconium dimethyl;
dimethylsiladiyl(2-tert-butyl,4-[3',5'-di-tbutylphenyl]indenyl)$_2$zirconium dimethyl;
dimethylsiladiyl(2-methyl,4-[3',5'-di-tbutylphenyl]indenyl)$_2$ hafnium dimethyl;
dimethylsiladiyl(2-ethyl,4-[3',5'-di-tbutylphenyl]indenyl)$_2$ hafnium dimethyl;
dimethylsiladiyl(2-n-propyl,4-[3',5'-di-tbutylphenyl]indenyl)$_2$hafnium dimethyl
dimethylsiladiyl(2-iso-propyl,4-[3',5'-di-tbutylphenyl]indenyl)$_2$hafnium dimethyl;
dimethylsiladiyl(2-n-butyl,4-[3',5'-di-tbutylphenyl]indenyl)$_2$ hafnium dimethyl;
dimethylsiladiyl(2-iso-butyl,4-[3',5'-di-tbutylphenyl]indenyl)$_2$hafnium dimethyl;
dimethylsiladiyl(2-sec-butyl,4-[3',5'-di-tbutylphenyl]indenyl)$_2$hafnium dimethyl;
dimethylsiladiyl(2-tert-butyl,4-[3',5'-di-tbutylphenyl]indenyl)$_2$hafnium dimethyl;
9-silafluorendiyl(2-methyl,4-[3',5'-di-tbutylphenyl]indenyl)$_2$ zirconium dimethyl;
9-silafluorendiyl(2-ethyl,4-[3',5'-di-tbutylphenyl]indenyl)$_2$ zirconium dimethyl;
9-silafluorendiyl(2-n-propyl,4-[3',5'-di-tbutylphenyl]indenyl)$_2$zirconium dimethyl;
9-silafluorendiyl(2-iso-propyl,4-[3',5'-di-tbutylphenyl]indenyl)$_2$zirconium dimethyl;
9-silafluorendiyl(2-n-butyl,4-[3',5'-di-tbutylphenyl]indenyl)$_2$ zirconium dimethyl;
9-silafluorendiyl(2-iso-butyl,4-[3',5'-di-tbutylphenyl]indenyl)$_2$zirconium dimethyl;
9-silafluorendiyl(2-sec-butyl,4-[3',5'-di-tbutylphenyl]indenyl)$_2$zirconium dimethyl;
9-silafluorendiyl(2-tert-butyl,4-[3',5'-di-tbutylphenyl]indenyl)$_2$zirconium dimethyl;
9-silafluorendiyl(2-methyl,4-[3',5'-di-tbutylphenyl]indenyl)$_2$ hafnium dimethyl;
9-silafluorendiyl(2-ethyl,4-[3',5'-di-tbutylphenyl]indenyl)2hafnium dimethyl;
9-silafluorendiyl(2-n-propyl,4-[3',5'-di-tbutylphenyl]indenyl)$_2$hafnium dimethyl;
9-silafluorendiyl(2-iso-propyl,4-[3',5'-di-tbutylphenyl]indenyl)$_2$hafnium dimethyl;

9-silafluorendiyl(2-n-butyl,4-[3',5'-di-tbutylphenyl]indenyl)₂ hafnium dimethyl;
9-silafluorendiyl(2-iso-butyl,4-[3',5'-di-tbutylphenyl]indenyl)₂hafnium dimethyl;
9-silafluorendiyl(2-sec-butyl,4-[3',5'-di-tbutylphenyl]indenyl)₂hafnium dimethyl;
9-silafluorendiyl(2-tert-butyl,4-[3',5'-di-tbutylphenyl]indenyl)₂hafnium dimethyl;
dimethylsiladiyl(2-methyl,4-[3',5'-bis-trifluoromethylphenyl]indenyl)₂zirconium dichloride;
dimethylsiladiyl(2-ethyl,4-[3',5'-bis-trifluoromethylphenyl]indenyl)₂zirconium dichloride;
dimethylsiladiyl(2-n-propyl,4-[3',5'-bis-trifluoromethylphenyl]indenyl)₂zirconium dichloride;
dimethylsiladiyl(2-iso-propyl,4-[3',5'-bis-trifluoromethylphenyl]indenyl)₂zirconium dichloride;
dimethylsiladiyl(2-n-butyl,4-[3',5'-bis-trifluoromethylphenyl]indenyl)₂zirconium dichloride;
dimethylsiladiyl(2-iso-butyl,4-[3',5'-bis-trifluoromethylphenyl]indenyl)₂zirconium dichloride;
dimethylsiladiyl(2-sec-butyl,4-[3',5'-bis-trifluoromethylphenyl]indenyl)₂zirconium dichloride;
dimethylsiladiyl(2-tert-butyl,4-[3',5'-bis-trifluoromethylphenyl]indenyl)₂zirconium dichloride;
dimethylsiladiyl(2-methyl,4-[3',5'-bis-trifluoromethylphenyl]indenyl)₂hafnium dichloride;
dimethylsiladiyl(2-ethyl,4-[3',5'-bis-trifluoromethylphenyl]indenyl)₂hafnium dichloride;
dimethylsiladiyl(2-n-propyl,4-[3',5'-bis-trifluoromethylphenyl]indenyl)₂hafnium dichloride;
dimethylsiladiyl(2-iso-propyl,4-[3',5'-bis-trifluoromethylphenyl]indenyl)₂hafnium dichloride;
dimethylsiladiyl(2-n-butyl,4-[3',5'-bis-trifluoromethylphenyl]indenyl)₂hafnium dichloride;
dimethylsiladiyl(2-iso-butyl,4-[3',5'-bis-trifluoromethylphenyl]indenyl)₂hafnium dichloride;
dimethylsiladiyl(2-sec-butyl,4-[3',5'-bis-trifluoromethylphenyl]indenyl)₂hafnium dichloride;
dimethylsiladiyl(2-tert-butyl,4-[3',5'-bis-trifluoromethylphenyl]indenyl)₂hafnium dichloride;
9-silafluorendiyl(2-methyl,4-[3',5'-bis-trifluoromethylphenyl]indenyl)₂zirconium dichloride;
dimethylsiladiyl(2-ethyl,4-[3',5'-bis-trifluoromethylphenyl]indenyl)₂hafnium dichloride;
9-silafluorendiyl(2-n-propyl,4-[3',5'-bis-trifluoromethylphenyl]indenyl)₂zirconium dichloride;
9-silafluorendiyl(2-iso-propyl,4-[3',5'-bis-trifluoromethylphenyl]indenyl)₂zirconium dichloride;
9-silafluorendiyl(2-n-butyl,4-[3',5'-bis-trifluoromethylphenyl]indenyl)₂zirconium dichloride;
9-silafluorendiyl(2-iso-butyl,4-[3',5'-bis-trifluoromethylphenyl]indenyl)₂zirconium dichloride;
9-silafluorendiyl(2-sec-butyl,4-[3',5'-bis-trifluoromethylphenyl]indenyl)₂zirconium dichloride;
9-silafluorendiyl(2-tert-butyl,4-[3',5'-bis-trifluoromethylphenyl]indenyl)₂zirconium dichloride;
9-silafluorendiyl(2-methyl,4-[3',5'-bis-trifluoromethylphenyl]indenyl)₂hafnium dichloride;
9-silafluorendiyl(2-ethyl,4-[3',5'-bis-trifluoromethylphenyl]indenyl)₂hafnium dichloride;
9-silafluorendiyl(2-n-propyl,4-[3',5'-bis-trifluoromethylphenyl]indenyl)₂ hafnium dichloride;
9-silafluorendiyl(2-iso-propyl,4-[3',5'-bis-trifluoromethylphenyl]indenyl)₂ hafnium dichloride;
9-silafluorendiyl(2-n-butyl,4-[3',5'-bis-trifluoromethylphenyl]indenyl)₂hafnium dichloride;
9-silafluorendiyl(2-iso-butyl,4-[3',5'-bis-trifluoromethylphenyl]indenyl)₂hafnium dichloride;
9-silafluorendiyl(2-sec-butyl,4-[3',5'-bis-trifluoromethylphenyl]indenyl)₂hafnium dichloride;
9-silafluorendiyl(2-tert-butyl,4-[3',5'-bis-trifluoromethylphenyl]indenyl)₂hafnium dichloride;
dimethylsiladiyl(2-methyl,4-[3',5'-bis-trifluoromethylphenyl]indenyl)₂zirconium dimethyl;
dimethylsiladiyl(2-ethyl,4-[3',5'-bis-trifluoromethylphenyl]indenyl)₂zirconium dimethyl;
dimethylsiladiyl(2-n-propyl,4-[3',5'-bis-trifluoromethylphenyl]indenyl)₂zirconium dimethyl;
dimethylsiladiyl(2-iso-propyl,4-[3',5'-bis-trifluoromethylphenyl]indenyl)₂zirconium dimethyl;
dimethylsiladiyl(2-n-butyl,4-[3',5'-bis-trifluoromethylphenyl]indenyl)₂zirconium dimethyl;
dimethylsiladiyl(2-iso-butyl,4-[3',5'-bis-trifluoromethylphenyl]indenyl)₂zirconium dimethyl;
dimethylsiladiyl(2-sec-butyl,4-[3',5'-bis-trifluoromethylphenyl]indenyl)₂zirconium dimethyl;
dimethylsiladiyl(2-tert-butyl,4-[3',5'-bis-trifluoromethylphenyl]indenyl)₂zirconium dimethyl;
dimethylsiladiyl(2-methyl,4-[3',5'-bis-trifluoromethylphenyl]indenyl)₂hafnium dimethyl;
dimethylsiladiyl(2-ethyl,4-[3',5'-bis-trifluoromethylphenyl]indenyl)₂hafnium dimethyl;
dimethylsiladiyl(2-n-propyl,4-[3',5'-bis-trifluoromethylphenyl]indenyl)₂hafnium dimethyl;
dimethylsiladiyl(2-iso-propyl,4-[3',5'-bis-trifluoromethylphenyl]indenyl)₂hafnium dimethyl;
dimethylsiladiyl(2-n-butyl,4-[3',5'-bis-trifluoromethylphenyl]indenyl)₂hafnium dimethyl;
dimethylsiladiyl(2-iso-butyl,4-[3',5'-bis-trifluoromethylphenyl]indenyl)₂hafnium dimethyl;
dimethylsiladiyl(2-sec-butyl,4-[3',5'-bis-trifluoromethylphenyl]indenyl)₂hafnium dimethyl;
dimethylsiladiyl(2-tert-butyl,4-[3',5'-bis-trifluoromethylphenyl]indenyl)₂hafnium dimethyl;
9-silafluorendiyl(2-methyl,4-[3',5'-bis-trifluoromethylphenyl]indenyl)₂zirconium dimethyl;
dimethylsiladiyl(2-ethyl,4-[3',5'-bis-trifluoromethylphenyl]indenyl)₂hafnium dimethyl;
9-silafluorendiyl(2-n-propyl,4-[3',5'-bis-trifluoromethylphenyl]indenyl)₂zirconium dimethyl;
9-silafluorendiyl(2-iso-propyl,4-[3',5'-bis-trifluoromethylphenyl]indenyl)₂zirconium dimethyl;
9-silafluorendiyl(2-n-butyl,4-[3',5'-bis-trifluoromethylphenyl]indenyl)₂zirconium dimethyl;
9-silafluorendiyl(2-iso-butyl,4-[3',5'-bis-trifluoromethylphenyl]indenyl)₂zirconium dimethyl;
9-silafluorendiyl(2-sec-butyl,4-[3',5'-bis-trifluoromethylphenyl]indenyl)₂zirconium dimethyl;
9-silafluorendiyl(2-tert-butyl,4-[3',5'-bis-trifluoromethylphenyl]indenyl)₂zirconium dimethyl;
9-silafluorendiyl(2-methyl,4-[3',5'-bis-trifluoromethylphenyl]indenyl)₂hafnium dimethyl;
9-silafluorendiyl(2-ethyl,4-[3',5'-bis-trifluoromethylphenyl]indenyl)₂hafnium dimethyl;
9-silafluorendiyl(2-n-propyl,4-[3',5'-bis-trifluoromethylphenyl]indenyl)₂ hafnium dimethyl;
9-silafluorendiyl(2-iso-propyl,4-[3',5'-bis-trifluoromethylphenyl]indenyl)₂ hafnium dimethyl;
9-silafluorendiyl(2-n-butyl,4-[3',5'-bis-trifluoromethylphenyl]indenyl)₂hafnium dimethyl;
9-silafluorendiyl(2-iso-butyl,4-[3',5'-bis-trifluoromethylphenyl]indenyl)₂hafnium dimethyl;

9-silafluorendiyl(2-sec-butyl,4-[3',5'-bis-trifluoromethylphenyl]indenyl)₂hafnium dimethyl;
9-silafluorendiyl(2-tert-butyl,4-[3',5'-bis-trifluoromethylphenyl]indenyl)₂hafnium dimethyl;
dimethylsiladiyl(2-ethyl,4-[3',5'-di-iso-propylphenyl]indenyl)₂zirconium dichloride;
dimethylsiladiyl(2-n-propyl,4-[3',5'-di-iso-propylphenyl]indenyl)₂zirconium dichloride
dimethylsiladiyl(2-iso-propyl,4-[3',5'-di-iso-propylphenyl]indenyl)₂zirconium dichloride;
dimethylsiladiyl(2-n-butyl,4-[3',5'-di-iso-propylphenyl]indenyl)₂zirconium dichloride;
dimethylsiladiyl(2-iso-butyl,4-[3',5'-di-iso-propylphenyl]indenyl)₂zirconium dichloride;
dimethylsiladiyl(2-sec-butyl,4-[3',5'-di-iso-propylphenyl]indenyl)₂zirconium dichloride;
dimethylsiladiyl(2-tert-butyl,4-[3',5'-di-iso-propylphenyl]indenyl)₂zirconium dichloride;
dimethylsiladiyl(2-ethyl,4-[3',5'-di-iso-propylphenyl]indenyl)₂hafnium dichloride;
dimethylsiladiyl(2-n-propyl,4-[3',5'-di-iso-propylphenyl]indenyl)₂hafnium dichloride;
dimethylsiladiyl(2-iso-propyl,4-[3',5'-di-iso-propylphenyl]indenyl)₂hafnium dichloride;
dimethylsiladiyl(2-n-butyl,4-[3',5'-di-iso-propylphenyl]indenyl)₂hafnium dichloride;
dimethylsiladiyl(2-iso-butyl,4-[3',5'-di-iso-propylphenyl]indenyl)₂hafnium dichloride;
dimethylsiladiyl(2-sec-butyl,4-[3',5'-di-iso-propylphenyl]indenyl)₂hafnium dichloride;
dimethylsiladiyl(2-tert-butyl,4-[3',5'-di-iso-propylphenyl]indenyl)₂hafnium dichloride;
9-silafluorendiyl(2-ethyl,4-[3',5'-di-iso-propylphenyl]indenyl)₂zirconium dichloride;
9-silafluorendiyl(2-n-propyl,4-[3',5'-di-iso-propylphenyl]indenyl)₂zirconium dichloride;
9-silafluorendiyl(2-iso-propyl,4-[3',5'-di-iso-propylphenyl]indenyl)₂zirconium dichloride;
9-silafluorendiyl(2-n-butyl,4-[3',5'-di-iso-propylphenyl]indenyl)₂zirconium dichloride;
9-silafluorendiyl(2-iso-butyl,4-[3',5'-di-iso-propylphenyl]indenyl)₂zirconium dichloride;
9-silafluorendiyl(2-sec-butyl,4-[3',5'-di-iso-propylphenyl]indenyl)₂zirconium dichloride;
9-silafluorendiyl(2-tert-butyl,4-[3',5'-di-iso-propylphenyl]indenyl)₂zirconium dichloride;
9-silafluorendiyl(2-ethyl,4-[3',5'-di-iso-propylphenyl]indenyl)₂hafnium dichloride;
9-silafluorendiyl(2-n-propyl,4-[3',5'-di-iso-propylphenyl]indenyl)₂hafnium dichloride;
9-silafluorendiyl(2-iso-propyl,4-[3',5'-di-iso-propylphenyl]indenyl)₂hafnium dichloride;
9-silafluorendiyl(2-n-butyl,4-[3',5'-di-iso-propylphenyl]indenyl)₂hafnium dichloride;
9-silafluorendiyl(2-iso-butyl,4-[3',5'-di-iso-propylphenyl]indenyl)₂hafnium dichloride;
9-silafluorendiyl(2-sec-butyl,4-[3',5'-di-iso-propylphenyl]indenyl)₂hafnium dichloride;
9-silafluorendiyl(2-tert-butyl,4-[3',5'-di-iso-propylphenyl]indenyl)₂hafnium dichloride;
dimethylsiladiyl(2-ethyl,4-[3',5'-di-iso-propylphenyl]indenyl)₂zirconium dimethyl;
dimethylsiladiyl(2-n-propyl,4-[3',5'-di-iso-propylphenyl]indenyl)₂zirconium dimethyl
dimethylsiladiyl(2-iso-propyl,4-[3',5'-di-iso-propylphenyl]indenyl)₂zirconium dimethyl;
dimethylsiladiyl(2-n-butyl,4-[3',5'-di-iso-propylphenyl]indenyl)₂zirconium dimethyl;
dimethylsiladiyl(2-isobutyl,4-[3',5'-di-iso-propylphenyl]indenyl)₂zirconium dimethyl;
dimethylsiladiyl(2-sec-butyl,4-[3',5'-di-iso-propylphenyl]indenyl)₂zirconium dimethyl;
dimethylsiladiyl(2-tert-butyl,4-[3',5'-di-iso-propylphenyl]indenyl)₂zirconium dimethyl;
dimethylsiladiyl(2-ethyl,4-[3',5'-di-iso-propylphenyl]indenyl)₂hafnium dimethyl;
dimethylsiladiyl(2-n-propyl,4-[3',5'-di-iso-propylphenyl]indenyl)₂hafnium dimethyl;
dimethylsiladiyl(2-iso-propyl,4-[3',5'-di-iso-propylphenyl]indenyl)₂hafnium dimethyl;
dimethylsiladiyl(2-n-butyl,4-[3',5'-di-iso-propylphenyl]indenyl)₂hafnium dimethyl;
dimethylsiladiyl(2-iso-butyl,4-[3',5'-di-iso-propylphenyl]indenyl)₂zirconium dimethyl;
dimethylsiladiyl(2-sec-butyl,4-[3',5'-di-iso-propylphenyl]indenyl)₂zirconium dimethyl;
dimethylsiladiyl(2-tert-butyl,4-[3',5'-di-iso-propylphenyl]indenyl)₂zirconium dimethyl;
9-silafluorendiyl(2-ethyl,4-[3',5'-di-iso-propylphenyl]indenyl)₂zirconium dimethyl;
9-silafluorendiyl(2-n-propyl,4-[3',5'-di-iso-propylphenyl]indenyl)₂zirconium dimethyl;
9-silafluorendiyl(2-iso-propyl,4-[3',5'-di-iso-propylphenyl]indenyl)₂zirconium dimethyl;
9-silafluorendiyl(2-n-butyl,4-[3',5'-di-iso-propylphenyl]indenyl)₂zirconium dimethyl;
9-silafluorendiyl(2-iso-butyl,4-[3',5'-di-iso-propylphenyl]indenyl)₂zirconium dimethyl;
9-silafluorendiyl(2-sec-butyl,4-[3',5'-di-iso-propylphenyl]indenyl)₂zirconium dimethyl;
9-silafluorendiyl(2-tert-butyl,4-[3',5'-di-iso-propylphenyl]indenyl)₂zirconium dimethyl;
9-silafluorendiyl(2-ethyl,4-[3',5'-di-iso-propylphenyl]indenyl)₂hafnium dimethyl;
9-silafluorendiyl(2-n-propyl,4-[3',5'-di-iso-propylphenyl]indenyl)₂hafnium dimethyl;
9-silafluorendiyl(2-iso-propyl,4-[3',5'-di-iso-propylphenyl]indenyl)₂hafnium dimethyl;
9-silafluorendiyl(2-n-butyl,4-[3',5'-di-iso-propylphenyl]indenyl)₂hafnium dimethyl;
9-silafluorendiyl(2-iso-butyl,4-[3',5'-di-iso-propylphenyl]indenyl)₂hafnium dimethyl;
9-silafluorendiyl(2-sec-butyl,4-[3',5'-di-iso-propylphenyl]indenyl)₂hafnium dimethyl;
9-silafluorendiyl(2-tert-butyl,4-[3',5'-di-iso-propylphenyl]indenyl)₂hafnium dimethyl;
dimethylsiladiyl(2-methyl,4-[3',5'-di-phenylphenyl]indenyl)₂zirconium dichloride;
dimethylsiladiyl(2-ethyl,4-[3',5'-di-phenylphenyl]indenyl)₂zirconium dichloride;
dimethylsiladiyl(2-n-propyl,4-[3',5'-di-phenylphenyl]indenyl)₂zirconium dichloride;
dimethylsiladiyl(2-iso-propyl,4-[3',5'-di-phenylphenyl]indenyl)₂zirconium dichloride;
dimethylsiladiyl(2-n-butyl,4-[3',5'-di-phenylphenyl]indenyl)₂zirconium dichloride;
dimethylsiladiyl(2-iso-butyl,4-[3',5'-di-phenylphenyl]indenyl)₂zirconium dichloride;
dimethylsiladiyl(2-sec-butyl,4-[3',5'-di-phenylphenyl]indenyl)₂zirconium dichloride;
dimethylsiladiyl(2-tert-butyl,4-[3',5'-di-phenylphenyl]indenyl)₂zirconium dichloride;

dimethylsiladiyl(2-methyl,4-[3',5'-di-phenylphenyl]indenyl)$_2$hafnium dichloride;
dimethylsiladiyl(2-ethyl,4-[3',5'-di-phenylphenyl]indenyl)$_2$hafnium dichloride;
dimethylsiladiyl(2-n-propyl,4-[3',5'-di-phenylphenyl]indenyl)$_2$hafnium dichloride;
dimethylsiladiyl(2-iso-propyl,4-[3',5'-di-phenylphenyl]indenyl)$_2$hafnium dichloride;
dimethylsiladiyl(2-n-butyl,4-[3',5'-di-phenylphenyl]indenyl)$_2$hafnium dichloride;
dimethylsiladiyl(2-iso-butyl,4-[3',5'-di-phenylphenyl]indenyl)$_2$hafnium dichloride;
dimethylsiladiyl(2-sec-butyl,4-[3',5'-di-phenylphenyl]indenyl)$_2$hafnium dichloride;
dimethylsiladiyl(2-tert-butyl,4-[3',5'-di-phenylphenyl]indenyl)$_2$hafnium dichloride;
9-silafluorendiyl(2-methyl,4-[3',5'-di-phenylphenyl]indenyl)$_2$zirconium dichloride;
9-silafluorendiyl(2-ethyl,4-[3',5'-di-phenylphenyl]indenyl)$_2$zirconium dichloride;
9-silafluorendiyl(2-n-propyl,4-[3',5'-di-phenylphenyl]indenyl)$_2$zirconium dichloride;
9-silafluorendiyl(2-iso-propyl,4-[3',5'-di-phenylphenyl]indenyl)$_2$zirconium dichloride;
9-silafluorendiyl(2-n-butyl,4-[3',5'-di-phenylphenyl]indenyl)$_2$zirconium dichloride;
9-silafluorendiyl(2-iso-butyl,4-[3',5'-di-phenylphenyl]indenyl)$_2$zirconium dichloride;
9-silafluorendiyl(2-sec-butyl,4-[3',5'-di-phenylphenyl]indenyl)$_2$zirconium dichloride;
9-silafluorendiyl(2-tert-butyl,4-[3',5'-di-phenylphenyl]indenyl)$_2$zirconium dichloride;
9-silafluorendiyl(2-methyl,4-[3',5'-di-phenylphenyl]indenyl)$_2$hafnium dichloride;
9-silafluorendiyl(2-ethyl,4-[3',5'-di-phenylphenyl]indenyl)$_2$hafnium dichloride;
9-silafluorendiyl(2-n-propyl,4-[3',5'-di-phenylphenyl]indenyl)$_2$hafnium dichloride;
9-silafluorendiyl(2-iso-propyl,4-[3',5'-di-phenylphenyl]indenyl)$_2$hafnium dichloride;
9-silafluorendiyl(2-n-butyl,4-[3',5'-di-phenylphenyl]indenyl)$_2$hafnium dichloride;
9-silafluorendiyl(2-iso-butyl,4-[3',5'-di-phenylphenyl]indenyl)$_2$hafnium dichloride;
9-silafluorendiyl(2-sec-butyl,4-[3',5'-di-phenylphenyl]indenyl)$_2$hafnium dichloride;
9-silafluorendiyl(2-tert-butyl,4-[3',5'-di-phenylphenyl]indenyl)$_2$hafnium dichloride;
dimethylsiladiyl(2-methyl,4-[3',5'-di-phenylphenyl]indenyl)$_2$zirconium dimethyl;
dimethylsiladiyl(2-ethyl,4-[3',5'-di-phenylphenyl]indenyl)$_2$zirconium dimethyl;
dimethylsiladiyl(2-n-propyl,4-[3',5'-di-phenylphenyl]indenyl)$_2$zirconium dimethyl;
dimethylsiladiyl(2-iso-propyl,4-[3',5'-di-phenylphenyl]indenyl)$_2$zirconium dimethyl;
dimethylsiladiyl(2-n-butyl,4-[3',5'-di-phenylphenyl]indenyl)$_2$zirconium dimethyl;
dimethylsiladiyl(2-iso-butyl,4-[3',5'-di-phenylphenyl]indenyl)$_2$zirconium dimethyl;
dimethylsiladiyl(2-sec-butyl,4-[3',5'-di-phenylphenyl]indenyl)$_2$zirconium dimethyl;
dimethylsiladiyl(2-tert-butyl,4-[3',5'-di-phenylphenyl]indenyl)$_2$zirconium dimethyl;
dimethylsiladiyl(2-methyl,4-[3',5'-di-phenylphenyl]indenyl)$_2$hafnium dimethyl;
dimethylsiladiyl(2-ethyl,4-[3',5'-di-phenylphenyl]indenyl)$_2$hafnium dimethyl;
dimethylsiladiyl(2-n-propyl,4-[3',5'-di-phenylphenyl]indenyl)$_2$hafnium dimethyl;
dimethylsiladiyl(2-iso-propyl,4-[3',5'-di-phenylphenyl]indenyl)$_2$hafnium dimethyl;
dimethylsiladiyl(2-n-butyl,4-[3',5'-di-phenylphenyl]indenyl)$_2$hafnium dimethyl;
dimethylsiladiyl(2-iso-butyl,4-[3',5'-di-phenylphenyl]indenyl)$_2$hafnium dimethyl;
dimethylsiladiyl(2-sec-butyl,4-[3',5'-di-phenylphenyl]indenyl)$_2$hafnium dimethyl;
dimethylsiladiyl(2-tert-butyl,4-[3',5'-di-phenylphenyl]indenyl)$_2$hafnium dimethyl;
9-silafluorendiyl(2-methyl,4-[3',5'-di-phenylphenyl]indenyl)$_2$zirconium dimethyl;
9-silafluorendiyl(2-ethyl,4-[3',5'-di-phenylphenyl]indenyl)$_2$zirconium dimethyl;
9-silafluorendiyl(2-n-propyl,4-[3',5'-di-phenylphenyl]indenyl)$_2$zirconium dimethyl;
9-silafluorendiyl(2-iso-propyl,4-[3',5'-di-phenylphenyl]indenyl)$_2$zirconium dimethyl;
9-silafluorendiyl(2-n-butyl,4-[3',5'-di-phenylphenyl]indenyl)$_2$zirconium dimethyl;
9-silafluorendiyl(2-iso-butyl,4-[3',5'-di-phenylphenyl]indenyl)$_2$zirconium dimethyl;
9-silafluorendiyl(2-sec-butyl,4-[3',5'-di-phenylphenyl]indenyl)$_2$zirconium dimethyl;
9-silafluorendiyl(2-tert-butyl,4-[3',5'-di-phenylphenyl]indenyl)$_2$zirconium dimethyl;
9-silafluorendiyl(2-methyl,4-[3',5'-di-phenylphenyl]indenyl)$_2$hafnium dimethyl;
9-silafluorendiyl(2-ethyl,4-[3',5'-di-phenylphenyl]indenyl)$_2$hafnium dichloride;
9-silafluorendiyl(2-n-propyl,4-[3',5'-di-phenylphenyl]indenyl)$_2$hafnium dimethyl;
9-silafluorendiyl(2-iso-propyl,4-[3',5'-di-phenylphenyl]indenyl)$_2$hafnium dimethyl;
9-silafluorendiyl(2-n-butyl,4-[3',5'-di-phenylphenyl]indenyl)$_2$hafnium dimethyl;
9-silafluorendiyl(2-iso-butyl,4-[3',5'-di-phenylphenyl]indenyl)$_2$hafnium dimethyl;
9-silafluorendiyl(2-sec-butyl,4-[3',5'-di-phenylphenyl]indenyl)$_2$hafnium dimethyl;
9-silafluorendiyl(2-tert-butyl,4-[3',5'-di-phenylphenyl]indenyl)$_2$hafnium dimethyl;
dimethylsiladiyl(2-methyl,4-[3',5'-di-tbutylphenyl]indenyl)$_2$ $\eta^4$-1,4-diphenyl-1,3-butadiene;
dimethylsiladiyl(2-ethyl,4-[3',5'-di-tbutylphenyl]indenyl)$_2$ $\eta^4$-1,4-diphenyl-1,3-butadiene;
dimethylsiladiyl(2-n-propyl,4-[3',5'-di-tbutylphenyl]indenyl)$_2$$\eta^4$-1,4-diphenyl-1,3-butadiene;
dimethylsiladiyl(2-iso-propyl,4-[3',5'-di-tbutylphenyl]indenyl)$_2$$\eta^4$-1,4-diphenyl-1,3-butadiene;
dimethylsiladiyl(2-n-butyl,4-[3',5'-di-tbutylphenyl]indenyl)$_2$ $\eta^4$-1,4-diphenyl-1,3-butadiene;
dimethylsiladiyl(2-iso-butyl,4-[3',5'-di-tbutylphenyl]indenyl)$_2$$\eta^4$-1,4-diphenyl-1,3-butadiene;
dimethylsiladiyl(2-sec-butyl,4-[3',5'-di-tbutylphenyl]indenyl)$_2$$\eta^4$-1,4-diphenyl-1,3-butadiene;
dimethylsiladiyl(2-tert-butyl,4-[3',5'-di-tbutylphenyl]indenyl)$_2$$\eta^4$-1,4-diphenyl-1,3-butadiene;
dimethylsiladiyl(2-ethyl,4-[3',5'-bis-trifluoromethylphenyl]indenyl)$_2$$\eta^4$-1,4-diphenyl-1,3-butadiene;
dimethylsiladiyl(2-n-propyl,4-[3',5'-bis-trifluoromethylphenyl]indenyl)$_2$$\eta^4$-1,4-diphenyl-1,3-butadiene;

dimethylsiladiyl(2-iso-propyl,4-[3',5'-bis-trifluoromethylphenyl]indenyl)$_2\eta^4$-1,4-diphenyl-1,3-butadiene;
dimethylsiladiyl(2-n-butyl,4-[3',5'-bis-trifluoromethylphenyl]indenyl)$_2\eta^4$-1,4-diphenyl-1,3-butadiene;
dimethylsiladiyl(2-iso-butyl,4-[3',5'-bis-trifluoromethylphenyl]indenyl)$_2\eta^4$-1,4-diphenyl-1,3-butadiene;
dimethylsiladiyl(2-sec-butyl,4-[3',5'-bis-trifluoromethylphenyl]indenyl)$_2\eta^4$-1,4-diphenyl-1,3-butadiene;
dimethylsiladiyl(2-tert-butyl,4-[3',5'-bis-trifluoromethylphenyl]indenyl)$_2\eta^4$-1,4-diphenyl-1,3-butadiene;
dimethylsiladiyl(2-ethyl,4-[3',5'-di-iso-propylphenyl]indenyl)$_2\eta^4$-1,4-diphenyl-1,3-butadiene;
dimethylsiladiyl(2-n-propyl,4-[3',5'-di-iso-propylphenyl]indenyl)$_2\eta^4$-1,4-diphenyl-1,3-butadiene;
dimethylsiladiyl(2-iso-propyl,4-[3',5'-di-iso-propylphenyl]indenyl)$_2\eta^4$-1,4-diphenyl-1,3-butadiene;
dimethylsiladiyl(2-n-butyl,4-[3',5'-di-iso-propylphenyl]indenyl)$_2\eta^4$-1,4-diphenyl-1,3-butadiene;
dimethylsiladiyl(2-iso-butyl,4-[3',5'-di-iso-propylphenyl]indenyl)$_2\eta^4$-1,4-diphenyl-1,3-butadiene;
dimethylsiladiyl(2-sec-butyl,4-[3',5'-di-iso-propylphenyl]indenyl)$_2\eta^4$-1,4-diphenyl-1,3-butadiene;
dimethylsiladiyl(2-tert-butyl,4-[3',5'-di-iso-propylphenyl]indenyl)$_2\eta^4$-1,4-diphenyl-1,3-butadiene;
dimethylsiladiyl(2-methyl,4-[3',5'-di-phenylphenyl]indenyl)$_2\eta^4$-1,4-diphenyl-1,3-butadiene;
dimethylsiladiyl(2-ethyl,4-[3',5'-di-phenylphenyl]indenyl)$_2\eta^4$-1,4-diphenyl-1,3-butadiene;
dimethylsiladiyl(2-n-propyl,4-[3',5'-di-phenylphenyl]indenyl)$_2\eta^4$-1,4-diphenyl-1,3-butadiene;
dimethylsiladiyl(2-iso-propyl,4-[3',5'-di-phenylphenyl]indenyl)$_2\eta^4$-1,4-diphenyl-1,3-butadiene;
dimethylsiladiyl(2-n-butyl,4-[3',5'-di-phenylphenyl]indenyl)$_2\eta^4$-1,4-diphenyl-1,3-butadiene;
dimethylsiladiyl(2-iso-butyl,4-[3',5'-di-phenylphenyl]indenyl)$_2\eta^4$-1,4-diphenyl-1,3-butadiene;
dimethylsiladiyl(2-sec-butyl,4-[3',5'-di-phenylphenyl]indenyl)$_2\eta^4$-1,4-diphenyl-1,3-butadiene;
dimethylsiladiyl(2-tert-butyl,4-[3',5'-di-phenylphenyl]indenyl)$_2\eta^4$-1,4-diphenyl-1,3-butadiene;
9-silafluorendiyl(2-methyl,4-[3',5'-di-tbutylphenyl]indenyl)$_2$ $\eta^4$-1,4-diphenyl-1,3-butadiene;
9-silafluorendiyl(2-ethyl,4-[3',5'-di-tbutylphenyl]indenyl)$_2$ $\eta^4$-1,4-diphenyl-1,3-butadiene;
9-silafluorendiyl(2-n-propyl,4-[3',5'-di-tbutylphenyl]indenyl)$_2\eta^4$-1,4-diphenyl-1,3-butadiene;
9-silafluorendiyl(2-iso-propyl,4-[3',5'-di-tbutylphenyl]indenyl)$_2\eta^4$-1,4-diphenyl-1,3-butadiene;
9-silafluorendiyl(2-n-butyl,4-[3',5'-di-tbutylphenyl]indenyl)$_2$ $\eta^4$-1,4-diphenyl-1,3-butadiene;
9-silafluorendiyl(2-iso-butyl,4-[3',5'-di-tbutylphenyl]indenyl)$_2\eta^4$-1,4-diphenyl-1,3-butadiene;
9-silafluorendiyl(2-sec-butyl,4-[3',5'-di-tbutylphenyl]indenyl)$_2\eta^4$-1,4-diphenyl-1,3-butadiene;
9-silafluorendiyl(2-tert-butyl,4-[3',5'-di-tbutylphenyl]indenyl)$_2\eta^4$-1,4-diphenyl-1,3-butadiene;
9-silafluorendiyl(2-ethyl,4-[3',5'-bis-trifluoromethylphenyl]indenyl)$_2\eta^4$-1,4-diphenyl-1,3-butadiene;
9-silafluorendiyl(2-n-propyl,4-[3',5'-bis-trifluoromethylphenyl]indenyl)$_2\eta^4$-1,4-diphenyl-1,3-butadiene;
9-silafluorendiyl(2-iso-propyl,4-[3',5'-bis-trifluoromethylphenyl]indenyl)$_2\theta^4$-1,4-diphenyl-1,3-butadiene;
9-silafluorendiyl(2-n-butyl,4-[3',5'-bis-trifluoromethylphenyl]indenyl)$_2\eta^4$-1,4-diphenyl-1,3-butadiene;
9-silafluorendiyl(2-iso-butyl,4-[3',5'-bis-trifluoromethylphenyl]indenyl)$_2\eta^4$-1,4-diphenyl-1,3-butadiene;
9-silafluorendiyl(2-sec-butyl,4-[3',5'-bis-trifluoromethylphenyl]indenyl)$_2\eta^4$-1,4-diphenyl-1,3-butadiene;
9-silafluorendiyl(2-tert-butyl,4-[3',5'-bis-trifluoromethylphenyl]indenyl)$_2\eta^4$-1,4-diphenyl-1,3-butadiene;
9-silafluorendiyl(2-ethyl,4-[3',5'-di-iso-propylphenyl]indenyl)$_2\eta^4$-1,4-diphenyl-1,3-butadiene;
9-silafluorendiyl(2-n-propyl,4-[3',5'-di-iso-propylphenyl]indenyl)$_2\eta^4$-1,4-diphenyl-1,3-butadiene;
9-silafluorendiyl(2-iso-propyl,4-[3',5'-di-iso-propylphenyl]indenyl)$_2\eta^4$-1,4-diphenyl-1,3-butadiene;
9-silafluorendiyl(2-n-butyl,4-[3',5'-di-iso-propylphenyl]indenyl)$_2\eta^4$-1,4-diphenyl-1,3-butadiene;
9-silafluorendiyl(2-iso-butyl,4-[3',5'-di-iso-propylphenyl]indenyl)$_2\eta^4$-1,4-diphenyl-1,3-butadiene;
9-silafluorendiyl(2-sec-butyl,4-[3',5'-di-iso-propylphenyl]indenyl)$_2\eta^4$-1,4-diphenyl-1,3-butadiene;
9-silafluorendiyl(2-tert-butyl,4-[3',5'-di-iso-propylphenyl]indenyl)$_2\eta^4$-1,4-diphenyl-1,3-butadiene;
9-silafluorendiyl(2-methyl,4-[3',5'-di-phenylphenyl]indenyl)$_2\eta^4$-1,4-diphenyl-1,3-butadiene;
9-silafluorendiyl(2-ethyl,4-[3',5'-di-phenylphenyl]indenyl)$_2$ $\eta^4$-1,4-diphenyl-1,3-butadiene;
9-silafluorendiyl(2-n-propyl,4-[3',5'-di-phenylphenyl]indenyl)$_2\eta^4$-1,4-diphenyl-1,3-butadiene;
9-silafluorendiyl(2-iso-propyl,4-[3',5'-di-phenylphenyl]indenyl)$_2\eta^4$-1,4-diphenyl-1,3-butadiene;
9-silafluorendiyl(2-n-butyl,4-[3',5'-di-phenylphenyl]indenyl)$_2\eta^4$-1,4-diphenyl-1,3-butadiene;
9-silafluorendiyl(2-iso-butyl,4-[3',5'-di-phenylphenyl]indenyl)$_2\eta^4$-1,4-diphenyl-1,3-butadiene;
9-silafluorendiyl(2-sec-butyl,4-[3',5'-di-phenylphenyl]indenyl)$_2\eta^4$-1,4-diphenyl-1,3-butadiene;
9-silafluorendiyl(2-tert-butyl,4-[3',5'-di-phenylphenyl]indenyl)$_2\eta^4$-1,4-diphenyl-1,3-butadiene;
dimethylamidoborane(2-methyl,4-[3',5'-di-tbutylphenyl]indenyl)$_2$zirconium dichloride;
dimethylamidoborane(2-ethyl,4-[3',5'-di-tbutylphenyl]indenyl)$_2$zirconium dichloride;
dimethylamidoborane(2-n-propyl,4-[3',5'-di-tbutylphenyl]indenyl)$_2$zirconium dichloride;
dimethylamidoborane(2-iso-propyl,4-[3',5'-di-tbutylphenyl]indenyl)$_2$zirconium dichloride;
dimethylamidoborane(2-n-butyl,4-[3',5'-di-tbutylphenyl]indenyl)$_2$zirconium dichloride;
dimethylamidoborane(2-iso-butyl,4-[3',5'-di-tbutylphenyl]indenyl)$_2$zirconium dichloride;
dimethylamidoborane(2-sec-butyl,4-[3',5'-di-tbutylphenyl]indenyl)$_2$zirconium dichloride;
dimethylamidoborane(2-tert-butyl,4-[3',5'-di-tbutylphenyl]indenyl)$_2$zirconium dichloride;
dimethylamidoborane(2-ethyl,4-[3',5'-bis-trifluoromethylphenyl]indenyl)$_2$zirconium dichloride;
dimethylamidoborane(2-n-propyl,4-[3',5'-bis-trifluoromethylphenyl]indenyl)$_2$zirconium dichloride;
dimethylamidoborane(2-iso-propyl,4-[3',5'-bis-trifluoromethylphenyl]indenyl)$_2$zirconium dichloride;
dimethylamidoborane(2-n-butyl,4-[3',5'-bis-trifluoromethylphenyl]indenyl)$_2$zirconium dichloride;
dimethylamidoborane(2-iso-butyl,4-[3',5'-bis-trifluoromethylphenyl]indenyl)$_2$zirconium dichloride;
dimethylamidoborane(2-sec-butyl,4-[3',5'-bis-trifluoromethylphenyl]indenyl)$_2$zirconium dichloride;
dimethylamidoborane(2-tert-butyl,4-[3',5'-bis-trifluoromethylphenyl]indenyl)$_2$zirconium dichloride;
dimethylamidoborane(2-ethyl,4-[3',5'-di-iso-propylphenyl]indenyl)$_2$zirconium dichloride;

dimethylamidoborane(2-n-propyl,4-[3',5'-di-iso-propylphenyl]indenyl)$_2$zirconium dichloride
dimethylamidoborane(2-iso-propyl,4-[3',5'-di-iso-propylphenyl]indenyl)$_2$zirconium dichloride;
dimethylamidoborane(2-n-butyl,4-[3',5'-di-iso-propylphenyl]indenyl)$_2$zirconium dichloride;
dimethylamidoborane(2-iso-butyl,4-[3',5'-di-iso-propylphenyl]indenyl)$_2$zirconium dichloride;
dimethylamidoborane(2-sec-butyl,4-[3',5'-di-iso-propylphenyl]indenyl)$_2$zirconium dichloride;
dimethylamidoborane(2-tert-butyl,4-[3',5'-di-iso-propylphenyl]indenyl)$_2$zirconium dichloride;
dimethylamidoborane(2-methyl,4-[3',5'-di-phenylphenyl]indenyl)$_2$zirconium dichloride;
dimethylamidoborane(2-ethyl,4-[3',5'-di-phenylphenyl]indenyl)$_2$zirconium dichloride;
dimethylamidoborane(2-n-propyl,4-[3',5'-di-phenylphenyl]indenyl)$_2$zirconium dichloride;
dimethylamidoborane(2-iso-propyl,4-[3',5'-di-phenylphenyl]indenyl)$_2$zirconium dichloride;
dimethylamidoborane(2-n-butyl,4-[3',5'-di-phenylphenyl]indenyl)$_2$zirconium dichloride;
dimethylamidoborane(2-iso-butyl,4-[3',5'-di-phenylphenyl]indenyl)$_2$zirconium dichloride;
dimethylamidoborane(2-sec-butyl,4-[3',5'-di-phenylphenyl]indenyl)$_2$zirconium dichloride;
dimethylamidoborane(2-tert-butyl,4-[3',5'-di-phenylphenyl]indenyl)$_2$zirconium dichloride;
dimethylamidoborane(2-methyl,4-[3',5'-di-tbutylphenyl]indenyl)$_2\eta^4$-1,4-diphenyl-1,3-butadiene;
dimethylamidoborane(2-ethyl,4-[3',5'-di-tbutylphenyl]indenyl)$_2\eta^4$-1,4-diphenyl-1,3-butadiene;
dimethylamidoborane(2-n-propyl,4-[3',5'-di-tbutylphenyl]indenyl)$_2\eta^4$-1,4-diphenyl-1,3-butadiene;
dimethylamidoborane(2-iso-propyl,4-[3',5'-di-tbutylphenyl]indenyl)$_2\eta^4$-1,4-diphenyl-1,3-butadiene;
dimethylamidoborane(2-n-butyl,4-[3',5'-di-tbutylphenyl]indenyl)$_2\eta^4$-1,4-diphenyl-1,3-butadiene;
dimethylamidoborane(2-iso-butyl,4-[3',5'-di-tbutylphenyl]indenyl)$_2\eta^4$-1,4-diphenyl-1,3-butadiene;
dimethylamidoborane(2-sec-butyl,4-[3',5'-di-tbutylphenyl]indenyl)$_2\eta^4$-1,4-diphenyl-1,3-butadiene;
dimethylamidoborane(2-tert-butyl,4-[3',5'-di-tbutylphenyl]indenyl)$_2\eta^4$-1,4-diphenyl-1,3-butadiene;
dimethylamidoborane(2-ethyl,4-[3',5'-bis-trifluoromethylphenyl]indenyl)$_2\eta^4$-1,4-diphenyl-1,3-butadiene;
dimethylamidoborane(2-n-propyl,4-[3',5'-bis-trifluoromethylphenyl]indenyl)$_2\eta^4$-1,4-diphenyl-1,3-butadiene;
dimethylamidoborane(2-iso-propyl,4-[3',5'-bis-trifluoromethylphenyl]indenyl)$_2\eta^4$-1,4-diphenyl-1,3-butadiene;
dimethylamidoborane(2-n-butyl,4-[3',5'-bis-trifluoromethylphenyl]indenyl)$_2\eta^4$-1,4-diphenyl-1,3-butadiene;
dimethylamidoborane(2-iso-butyl,4-[3',5'-bis-trifluoromethylphenyl]indenyl)$_2\eta^4$-1,4-diphenyl-1,3-butadiene;
dimethylamidoborane(2-sec-butyl,4-[3',5'-bis-trifluoromethylphenyl]indenyl)$_2\eta^4$-1,4-diphenyl-1,3-butadiene;
dimethylamidoborane(2-tert-butyl,4-[3',5'-bis-trifluoromethylphenyl]indenyl)$_2\eta^4$-1,4-diphenyl-1,3-butadiene;
dimethylamidoborane(2-ethyl,4-[3',5'-di-iso-propylphenyl]indenyl)$_2\eta^4$-1,4-diphenyl-1,3-butadiene;
dimethylamidoborane(2-n-propyl,4-[3',5'-di-iso-propylphenyl]indenyl)$_2\eta^4$-1,4-diphenyl-1,3-butadiene;
dimethylamidoborane(2-iso-propyl,4-[3',5'-di-iso-propylphenyl]indenyl)$_2\eta^4$-1,4-diphenyl-1,3-butadiene;
dimethylamidoborane(2-n-butyl,4-[3',5'-di-iso-propylphenyl]indenyl)$_2\eta^4$-1,4-diphenyl-1,3-butadiene;
dimethylamidoborane(2-iso-butyl,4-[3',5'-di-iso-propylphenyl]indenyl)$_2\eta^4$-1,4-diphenyl-1,3-butadiene;
dimethylamidoborane(2-sec-butyl,4-[3',5'-di-iso-propylphenyl]indenyl)$_2\eta^4$-1,4-diphenyl-1,3-butadiene;
dimethylamidoborane(2-tert-butyl,4-[3',5'-di-iso-propylphenyl]indenyl)$_2\eta^4$-1,4-diphenyl-1,3-butadiene;
dimethylamidoborane(2-methyl,4-[3',5'-di-phenylphenyl]indenyl)$_2\eta^4$-1,4-diphenyl-1,3-butadiene;
dimethylamidoborane(2-ethyl,4-[3',5'-di-phenylphenyl]indenyl)$_2\eta^4$-1,4-diphenyl-1,3-butadiene;
dimethylamidoborane(2-n-propyl,4-[3',5'-di-phenylphenyl]indenyl)$_2\eta^4$-1,4-diphenyl-1,3-butadiene;
dimethylamidoborane(2-iso-propyl,4-[3',5'-di-phenylphenyl]indenyl)$_2\eta^4$-1,4-diphenyl-1,3-butadiene;
dimethylamidoborane(2-n-butyl,4-[3',5'-di-phenylphenyl]indenyl)$_2\eta^4$-1,4-diphenyl-1,3-butadiene;
dimethylamidoborane(2-iso-butyl,4-[3',5'-di-phenylphenyl]indenyl)$_2\eta^4$-1,4-diphenyl-1,3-butadiene;
dimethylamidoborane(2-sec-butyl,4-[3',5'-di-phenylphenyl]indenyl)$_2\eta^4$-1,4-diphenyl-1,3-butadiene;
dimethylamidoborane(2-tert-butyl,4-[3',5'-di-phenylphenyl]indenyl)$_2\eta^4$-1,4-diphenyl-1,3-butadiene;
dimethylamidoborane(2-methyl,4-[3',5'-di-tbutylphenyl]indenyl)$_2$ zirconium dimethyl;
dimethylamidoborane(2-ethyl,4-[3',5'-di-tbutylphenyl]indenyl)$_2$zirconium dimethyl;
dimethylamidoborane(2-n-propyl,4-[3',5'-di-tbutylphenyl]indenyl)$_2$zirconium dimethyl;
dimethylamidoborane(2-iso-propyl,4-[3',5'-di-tbutylphenyl]indenyl)$_2$zirconium dimethyl;
dimethylamidoborane(2-n-butyl,4-[3',5'-di-tbutylphenyl]indenyl)$_2$zirconium dimethyl;
dimethylamidoborane(2-iso-butyl,4-[3',5'-di-tbutylphenyl]indenyl)$_2$zirconium dimethyl;
dimethylamidoborane(2-sec-butyl,4-[3',5'-di-tbutylphenyl]indenyl)$_2$zirconium dimethyl;
dimethylamidoborane(2-tert-butyl,4-[3',5'-di-tbutylphenyl]indenyl)$_2$zirconium dimethyl;
dimethylamidoborane(2-ethyl,4-[3',5'-bis-trifluoromethylphenyl]indenyl)$_2$zirconium dimethyl;
dimethylamidoborane(2-n-propyl,4-[3',5'-bis-trifluoromethylphenyl]indenyl)$_2$zirconium dimethyl;
dimethylamidoborane(2-iso-propyl,4-[3',5'-bis-trifluoromethylphenyl]indenyl)$_2$zirconium dimethyl;
dimethylamidoborane(2-n-butyl,4-[3',5'-bis-trifluoromethylphenyl]indenyl)$_2$zirconium dimethyl;
dimethylamidoborane(2-iso-butyl,4-[3',5'-bis-trifluoromethylphenyl]indenyl)$_2$zirconium dimethyl;
dimethylamidoborane(2-sec-butyl,4-[3',5'-bis-trifluoromethylphenyl]indenyl)$_2$zirconium dimethyl;
dimethylamidoborane(2-tert-butyl,4-[3',5'-bis-trifluoromethylphenyl]indenyl)$_2$zirconium dimethyl;
dimethylamidoborane(2-ethyl,4-[3',5'-di-iso-propylphenyl]indenyl)$_2$zirconium dimethyl;
dimethylamidoborane(2-n-propyl,4-[3',5'-di-iso-propylphenyl]indenyl)$_2$zirconium dimethyl
dimethylamidoborane(2-iso-propyl,4-[3',5'-di-iso-propylphenyl]indenyl)$_2$zirconium dimethyl;
dimethylamidoborane(2-n-butyl,4-[3',5'-di-iso-propylphenyl]indenyl)$_2$zirconium dimethyl;
dimethylamidoborane(2-iso-butyl,4-[3',5'-di-iso-propylphenyl]indenyl)$_2$zirconium dimethyl;
dimethylamidoborane(2-sec-butyl,4-[3',5'-di-iso-propylphenyl]indenyl)$_2$zirconium dimethyl;
dimethylamidoborane(2-tert-butyl,4-[3',5'-di-iso-propylphenyl]indenyl)$_2$zirconium dimethyl;

dimethylamidoborane(2-methyl,4-[3',5'-di-phenylphenyl]
  indenyl)$_2$zirconium dimethyl;
dimethylamidoborane(2-ethyl,4-[3',5'-di-phenylphenyl]indenyl)$_2$zirconium dimethyl;
dimethylamidoborane(2-n-propyl,4-[3',5'-di-phenylphenyl]
  indenyl)$_2$zirconium dimethyl;
dimethylamidoborane(2-iso-propyl,4-[3',5'-di-phenylphenyl]indenyl)$_2$zirconium dimethyl;
dimethylamidoborane(2-n-butyl,4-[3',5'-di-phenylphenyl]
  indenyl)$_2$zirconium dimethyl;
dimethylamidoborane(2-iso-butyl,4-[3',5'-di-phenylphenyl]
  indenyl)$_2$zirconium dimethyl;
dimethylamidoborane(2-sec-butyl,4-[3',5'-di-phenylphenyl]
  indenyl)$_2$zirconium dimethyl;
dimethylamidoborane(2-tert-butyl,4-[3',5'-di-phenylphenyl]
  indenyl)$_2$zirconium dimethyl;
diisopropylamidoborane(2-methyl,4-[3',5'-di-tbutylphenyl]
  indenyl)$_2$zirconium dichloride;
diisopropylamidoborane(2-ethyl,4-[3',5'-di-tbutylphenyl]indenyl)$_2$zirconium dichloride;
diisopropylamidoborane(2-n-propyl,4-[3',5'-di-tbutylphenyl]indenyl)$_2$zirconium dichloride;
diisopropylamidoborane(2-iso-propyl,4-[3',5'-di-tbutylphenyl]indenyl)$_2$zirconium dichloride;
diisopropylamidoborane(2-n-butyl,4-[3',5'-di-tbutylphenyl]indenyl)$_2$zirconium dichloride;
diisopropylamidoborane(2-iso-butyl,4-[3',5'-di-tbutylphenyl]indenyl)$_2$zirconium dichloride;
diisopropylamidoborane(2-sec-butyl,4-[3',5'-di-tbutylphenyl]indenyl)$_2$zirconium dichloride;
diisopropylamidoborane(2-tert-butyl,4-[3',5'-di-tbutylphenyl]indenyl)$_2$zirconium dichloride;
diisopropylamidoborane(2-ethyl,4-[3',5'-bis-trifluoromethylphenyl]indenyl)$_2$zirconium dichloride;
diisopropylamidoborane(2-n-propyl,4-[3',5'-bis-trifluoromethylphenyl]indenyl)$_2$zirconium dichloride;
diisopropylamidoborane(2-iso-propyl,4-[3',5'-bis-trifluoromethylphenyl]indenyl)$_2$zirconium dichloride;
diisopropylamidoborane(2-n-butyl,4-[3',5'-bis-trifluoromethylphenyl]indenyl)$_2$zirconium dichloride;
diisopropylamidoborane(2-iso-butyl,4-[3',5'-bis-trifluoromethylphenyl]indenyl)$_2$zirconium dichloride;
diisopropylamidoborane(2-sec-butyl,4-[3',5'-bis-trifluoromethylphenyl]indenyl)$_2$zirconium dichloride;
diisopropylamidoborane(2-tert-butyl,4-[3',5'-bis-trifluoromethylphenyl]indenyl)$_2$zirconium dichloride;
diisopropylamidoborane(2-ethyl,4-[3',5'-di-iso-propylphenyl]indenyl)$_2$zirconium dichloride;
diisopropylamidoborane(2-n-propyl,4-[3',5'-di-iso-propylphenyl]indenyl)$_2$zirconium dichloride diisopropylamidoborane(2-iso-propyl,4-[3',5'-di-iso-propylphenyl]indenyl)$_2$zirconium dichloride;
diisopropylamidoborane(2-n-butyl,4-[3',5'-di-iso-propylphenyl]indenyl)$_2$zirconium dichloride;
diisopropylamidoborane(2-iso-butyl,4-[3',5'-di-iso-propylphenyl]indenyl)$_2$zirconium dichloride;
diisopropylamidoborane(2-sec-butyl,4-[3',5'-di-iso-propylphenyl]indenyl)$_2$zirconium dichloride;
diisopropylamidoborane(2-tert-butyl,4-[3',5'-di-iso-propylphenyl]indenyl)$_2$zirconium dichloride;
diisopropylamidoborane(2-methyl,4-[3',5'-di-phenylphenyl]
  indenyl)$_2$zirconium dichloride;
diisopropylamidoborane(2-ethyl,4-[3',5'-di-phenylphenyl]
  indenyl)$_2$zirconium dichloride;
diisopropylamidoborane(2-n-propyl,4-[3',5'-di-phenylphenyl]indenyl)$_2$zirconium dichloride;
diisopropylamidoborane(2-iso-propyl,4-[3',5'-di-phenylphenyl]indenyl)$_2$zirconium dichloride;
diisopropylamidoborane(2-n-butyl,4-[3',5'-di-phenylphenyl]indenyl)$_2$zirconium dichloride;
diisopropylamidoborane(2-iso-butyl,4-[3',5'-di-phenylphenyl]indenyl)$_2$zirconium dichloride;
diisopropylamidoborane(2-sec-butyl,4-[3',5'-di-phenylphenyl]indenyl)$_2$zirconium dichloride;
diisopropylamidoborane(2-tert-butyl,4-[3',5'-di-phenylphenyl]indenyl)$_2$zirconium dichloride;
diisopropylamidoborane(2-methyl,4-[3',5'-di-tbutylphenyl]
  indenyl)$_2\eta^4$-1,4-diphenyl-1,3-butadiene;
diisopropylamidoborane(2-ethyl,4-[3',5'-di-tbutylphenyl]indenyl)$_2\eta^4$-1,4-diphenyl-1,3-butadiene;
diisopropylamidoborane(2-n-propyl,4-[3',5'-di-tbutylphenyl]indenyl)$_2\eta^4$-1,4-diphenyl-1,3-butadiene;
diisopropylamidoborane(2-iso-propyl,4-[3',5'-di-tbutylphenyl]indenyl)$_2\eta^4$-1,4-diphenyl-1,3-butadiene;
diisopropylamidoborane(2-n-butyl,4-[3',5'-di-tbutylphenyl]
  indenyl)$_2\eta^4$-1,4-diphenyl-1,3-butadiene;
diisopropylamidoborane(2-iso-butyl,4-[3',5'-di-tbutylphenyl]indenyl)$_2\eta^4$-1,4-diphenyl-1,3-butadiene;
diisopropylamidoborane(2-sec-butyl,4-[3',5'-di-tbutylphenyl]indenyl)$_2\eta^4$-1,4-diphenyl-1,3-butadiene;
diisopropylamidoborane(2-tert-butyl,4-[3',5'-di-tbutylphenyl]indenyl)$_2\eta^4$-1,4-diphenyl-1,3-butadiene;
diisopropylamidoborane(2-ethyl,4-[3',5'-bis-trifluoromethylphenyl]indenyl)$_2\eta^4$-1,4-diphenyl-1,3-butadiene;
diisopropylamidoborane(2-n-propyl,4-[3',5'-bis-trifluoromethylphenyl]indenyl)$_2\eta^4$-1,4-diphenyl-1,3-butadiene;
diisopropylamidoborane(2-iso-propyl,4-[3',5'-bis-trifluoromethylphenyl]indenyl)$_2\eta^4$-1,4-diphenyl-1,3-butadiene;
diisopropylamidoborane(2-n-butyl,4-[3',5'-bis-trifluoromethylphenyl]indenyl)$_2\eta^4$-1,4-diphenyl-1,3-butadiene;
diisopropylamidoborane(2-iso-butyl,4-[3',5'-bis-trifluoromethylphenyl]indenyl)$_2\eta^4$-1,4-diphenyl-1,3-butadiene;
diisopropylamidoborane(2-sec-butyl,4-[3',5'-bis-trifluoromethylphenyl]indenyl)$_2\eta^4$-1,4-diphenyl-1,3-butadiene;
diisopropylamidoborane(2-tert-butyl,4-[3',5'-bis-trifluoromethylphenyl]indenyl)$_2\eta^4$-1,4-diphenyl-1,3-butadiene;
diisopropylamidoborane(2-ethyl,4-[3',5'-di-iso-propylphenyl]indenyl)$_2\eta^4$-1,4-diphenyl-1,3-butadiene;
diisopropylamidoborane(2-n-propyl,4-[3',5'-di-iso-propylphenyl]indenyl)$_2\eta^4$-1,4-diphenyl-1,3-butadiene;
diisopropylamidoborane(2-iso-propyl,4-[3',5'-di-iso-propylphenyl]indenyl)$_2\eta^4$-1,4-diphenyl-1,3-butadiene;
diisopropylamidoborane(2-n-butyl,4-[3',5'-di-iso-propylphenyl]indenyl)$_2\eta^4$-1,4-diphenyl-1,3-butadiene;
diisopropylamidoborane(2-iso-butyl,4-[3',5'-di-iso-propylphenyl]indenyl)$_2\eta^4$-1,4-diphenyl-1,3-butadiene;
diisopropylamidoborane(2-sec-butyl,4-[3',5'-di-iso-propylphenyl]indenyl)$_2\eta^4$-1,4-diphenyl-1,3-butadiene;
diisopropylamidoborane(2-tert-butyl,4-[3',5'-di-iso-propylphenyl]indenyl)$_2\eta^4$-1,4-diphenyl-1,3-butadiene;
diisopropylamidoborane(2-methyl,4-[3',5'-di-phenylphenyl]
  indenyl)$_2\eta^4$-1,4-diphenyl-1,3-butadiene;
diisopropylamidoborane(2-ethyl,4-[3',5'-di-phenylphenyl]
  indenyl)$_2\eta^4$-1,4-diphenyl-1,3-butadiene;
diisopropylamidoborane(2-n-propyl,4-[3',5'-di-phenylphenyl]indenyl)$_2\eta^4$-1,4-diphenyl-1,3-butadiene;
diisopropylamidoborane(2-iso-propyl,4-[3',5'-di-phenylphenyl]indenyl)$_2\eta^4$-1,4-diphenyl-1,3-butadiene;
diisopropylamidoborane(2-n-butyl,4-[3',5'-di-phenylphenyl]indenyl)$_2\eta^4$-1,4-diphenyl-1,3-butadiene;
diisopropylamidoborane(2-iso-butyl,4-[3',5'-di-phenylphenyl]indenyl)$_2\eta^4$-1,4-diphenyl-1,3-butadiene;

diisopropylamidoborane(2-sec-butyl,4-[3',5'-di-phenylphenyl]indenyl)$_2\eta^4$-1,4-diphenyl-1,3-butadiene;
diisopropylamidoborane(2-tert-butyl,4-[3',5'-di-phenylphenyl]indenyl)$_2\eta^4$-1,4-diphenyl-1,3-butadiene;
diisopropylamidoborane(2-methyl,4-[3',5'-di-tbutylphenyl]indenyl)$_2$zirconium dimethyl;
diisopropylamidoborane(2-ethyl,4-[3',5'-di-tbutylphenyl]indenyl)$_2$zirconium dimethyl;
diisopropylamidoborane(2-n-propyl,4-[31,5'-di-tbutylphenyl]indenyl)$_2$zirconium dimethyl;
diisopropylamidoborane(2-iso-propyl,4-[3',5'-di-tbutylphenyl]indenyl)$_2$zirconium dimethyl;
diisopropylamidoborane(2-n-butyl,4-[3',5'-di-tbutylphenyl]indenyl)$_2$zirconium dimethyl;
diisopropylamidoborane(2-iso-butyl,4-[3',5'-di-tbutylphenyl]indenyl)$_2$zirconium dimethyl;
diisopropylamidoborane(2-sec-butyl,4-[3',5'-di-tbutylphenyl]indenyl)$_2$zirconium dimethyl;
diisopropylamidoborane(2-tert-butyl,4-[31,5'-di-tbutylphenyl]indenyl)$_2$zirconium dimethyl;
diisopropylamidoborane(2-ethyl,4-[3',5'-bis-trifluoromethylphenyl]indenyl)$_2$zirconium dimethyl;
diisopropylamidoborane(2-n-propyl,4-[3',5'-bis-trifluoromethylphenyl]indenyl)$_2$zirconium dimethyl;
diisopropylamidoborane(2-iso-propyl,4-[3',5'-bis-trifluoromethylphenyl]indenyl)$_2$zirconium dimethyl;
diisopropylamidoborane(2-n-butyl,4-[3',5'-bis-trifluoromethylphenyl]indenyl)$_2$zirconium dimethyl;
diisopropylamidoborane(2-iso-butyl,4-[3',5'-bis-trifluoromethylphenyl]indenyl)$_2$zirconium dimethyl;
diisopropylamidoborane(2-sec-butyl,4-[3',5'-bis-trifluoromethylphenyl]indenyl)$_2$zirconium dimethyl;
diisopropylamidoborane(2-tert-butyl,4-[3',5'-bis-trifluoromethylphenyl]indenyl)$_2$zirconium dimethyl;
diisopropylamidoborane(2-ethyl,4-[3',5'-di-iso-propylphenyl]indenyl)$_2$zirconium dimethyl;
diisopropylamidoborane(2-n-propyl,4-[3',5'-di-iso-propylphenyl]indenyl)$_2$zirconium dimethyl diisopropylamidoborane(2-iso-propyl,4-[3',5'-di-iso-propylphenyl]indenyl)$_2$zirconium dimethyl;
diisopropylamidoborane(2-n-butyl,4-[3',5'-di-iso-propylphenyl]indenyl)$_2$zirconium dimethyl;
diisopropylamidoborane(2-iso-butyl,4-[3',5'-di-iso-propylphenyl]indenyl)$_2$zirconium dimethyl;
diisopropylamidoborane(2-sec-butyl,4-[3',5'-di-iso-propylphenyl]indenyl)$_2$zirconium dimethyl;
diisopropylamidoborane(2-tert-butyl,4-[3',5'-di-iso-propylphenyl]indenyl)$_2$zirconium dimethyl;
diisopropylamidoborane(2-methyl,4-[3',5'-di-phenylphenyl]indenyl)$_2$zirconium dimethyl;
diisopropylamidoborane(2-ethyl,4-[3',5'-di-phenylphenyl]indenyl)$_2$zirconium dimethyl;
diisopropylamidoborane(2-n-propyl,4-[3',5'-di-phenylphenyl]indenyl)$_2$zirconium dimethyl;
diisopropylamidoborane(2-iso-propyl,4-[3',5'-di-phenylphenyl]indenyl)$_2$zirconium dimethyl;
diisopropylamidoborane(2-n-butyl,4-[3',5'-di-phenylphenyl]indenyl)$_2$zirconium dimethyl;
diisopropylamidoborane(2-iso-butyl,4-[3',5'-di-phenylphenyl]indenyl)$_2$zirconium dimethyl;
diisopropylamidoborane(2-sec-butyl,4-[3',5'-di-phenylphenyl]indenyl)$_2$zirconium dimethyl;
diisopropylamidoborane(2-tert-butyl,4-[3',5'-di-phenylphenyl]indenyl)$_2$zirconium dimethyl;
bis(trimethylsilyl)amidoborane(2-methyl,4-[3',5'-di-tbutylphenyl]indenyl)$_2$zirconium dichloride;
bis(trimethylsilyl)amidoborane(2-ethyl,4-[3',5'-di-tbutylphenyl]indenyl)$_2$zirconium dichloride;
bis(trimethylsilyl)amidoborane(2-n-propyl,4-[3',5'-di-tbutylphenyl]indenyl)$_2$zirconium dichloride;
bis(trimethylsilyl)amidoborane(2-iso-propyl,4-[3',5'-di-tbutylphenyl]indenyl)$_2$zirconium dichloride;
bis(trimethylsilyl)amidoborane(2-n-butyl,4-[3',5'-di-tbutylphenyl]indenyl)$_2$zirconium dichloride;
bis(trimethylsilyl)amidoborane(2-iso-butyl,4-[3',5'-di-tbutylphenyl]indenyl)$_2$zirconium dichloride;
bis(trimethylsilyl)amidoborane(2-sec-butyl,4-[3',5'-di-tbutylphenyl]indenyl)$_2$zirconium dichloride;
bis(trimethylsilyl)amidoborane(2-tert-butyl,4-[3',5'-di-tbutylphenyl]indenyl)$_2$zirconium dichloride;
bis(trimethylsilyl)amidoborane(2-ethyl,4-[3',5'-bis-trifluoromethylphenyl]indenyl)$_2$zirconium dichloride;
bis(trimethylsilyl)amidoborane(2-n-propyl,4-[3',5'-bis-trifluoromethylphenyl]indenyl)$_2$zirconium dichloride;
bis(trimethylsilyl)amidoborane(2-iso-propyl,4-[3',5'-bis-trifluoromethylphenyl]indenyl)$_2$zirconium dichloride;
bis(trimethylsilyl)amidoborane(2-n-butyl,4-[3',5'-bis-trifluoromethylphenyl]indenyl)$_2$zirconium dichloride;
bis(trimethylsilyl)amidoborane(2-iso-butyl,4-[3',5'-bis-trifluoromethylphenyl]indenyl)$_2$zirconium dichloride;
bis(trimethylsilyl)amidoborane(2-sec-butyl,4-[3',5'-bis-trifluoromethylphenyl]indenyl)$_2$zirconium dichloride;
bis(trimethylsilyl)amidoborane(2-tert-butyl,4-[3',5'-bis-trifluoromethylphenyl]indenyl)$_2$zirconium dichloride;
bis(trimethylsilyl)amidoborane(2-ethyl,4-[3',5'-di-iso-propylphenyl]indenyl)$_2$zirconium dichloride;
bis(trimethylsilyl)amidoborane(2-n-propyl,4-[3',5'-di-iso-propylphenyl]indenyl)$_2$zirconium dichloride bis(trimethylsilyl)amidoborane(2-iso-propyl,4-[3',5'-di-iso-propylphenyl]indenyl)$_2$zirconium dichloride;
bis(trimethylsilyl)amidoborane(2-n-butyl,4-[3',5'-di-iso-propylphenyl]indenyl)$_2$zirconium dichloride;
bis(trimethylsilyl)amidoborane(2-iso-butyl,4-[3',5'-di-iso-propylphenyl]indenyl)$_2$zirconium dichloride;
bis(trimethylsilyl)amidoborane(2-sec-butyl,4-[3',5'-di-iso-propylphenyl]indenyl)$_2$zirconium dichloride;
bis(trimethylsilyl)amidoborane(2-tert-butyl,4-[3',5'-di-iso-propylphenyl]indenyl)$_2$zirconium dichloride;
bis(trimethylsilyl)amidoborane(2-methyl,4-[3',5'-di-phenylphenyl]indenyl)$_2$zirconium dichloride;
bis(trimethylsilyl)amidoborane(2-ethyl,4-[3',5'-di-phenylphenyl]indenyl)$_2$zirconium dichloride;
bis(trimethylsilyl)amidoborane(2-n-propyl,4-[3',5'-di-phenylphenyl]indenyl)$_2$zirconium dichloride;
bis(trimethylsilyl)amidoborane(2-iso-propyl,4-[3',5'-di-phenylphenyl]indenyl)$_2$zirconium dichloride;
bis(trimethylsilyl)amidoborane(2-n-butyl,4-[3',5'-di-phenylphenyl]indenyl)$_2$zirconium dichloride;
bis(trimethylsilyl)amidoborane(2-iso-butyl,4-[3',5'-di-phenylphenyl]indenyl)$_2$zirconium dichloride;
bis(trimethylsilyl)amidoborane(2-sec-butyl,4-[3',5'-di-phenylphenyl]indenyl)$_2$zirconium dichloride;
bis(trimethylsilyl)amidoborane(2-tert-butyl,4-[3',5'-di-phenylphenyl]indenyl)$_2$zirconium dichloride;
bis(trimethylsilyl)amidoborane(2-methyl,4-[3',5'-di-tbutylphenyl]indenyl)$_2\eta^4$-1,4-diphenyl-1,3-butadiene;
bis(trimethylsilyl)amidoborane(2-ethyl,4-[3',5'-di-tbutylphenyl]indenyl)$_2\eta^4$-1,4-diphenyl-1,3-butadiene;
bis(trimethylsilyl)amidoborane(2-n-propyl,4-[3',5'-di-tbutylphenyl]indenyl)$_2\eta^4$-1,4-diphenyl-1,3-butadiene;
bis(trimethylsilyl)amidoborane(2-iso-propyl,4-[3',5'-di-tbutylphenyl]indenyl)$_2\eta^4$-1,4-diphenyl-1,3-butadiene;

bis(trimethylsilyl)amidoborane(2-n-butyl,4-[31,5'-di-tbutylphenyl]indenyl)$_2$$\eta^4$-1,4-diphenyl-1,3-butadiene;
bis(trimethylsilyl)amidoborane(2-iso-butyl,4-[3',5'-di-tbutylphenyl]indenyl)$_2$$\eta^4$-1,4-diphenyl-1,3-butadiene;
bis(trimethylsilyl)amidoborane(2-sec-butyl,4-[3',5'-di-tbutylphenyl]indenyl)$_2$$\eta^4$-1,4-diphenyl-1,3-butadiene;
bis(trimethylsilyl)amidoborane(2-tert-butyl,4-[3',5'-di-tbutylphenyl]indenyl)$_2$$\eta^4$-1,4-diphenyl-1,3-butadiene;
bis(trimethylsilyl)amidoborane(2-ethyl,4-[3',5'-bis-trifluoromethylphenyl]indenyl)$_2$$\eta^4$-1,4-diphenyl-1,3-butadiene;
bis(trimethylsilyl)amidoborane(2-n-propyl,4-[3',5'-bis-trifluoromethylphenyl]indenyl)$_2$$\eta^4$-1,4-diphenyl-1,3-butadiene;
bis(trimethylsilyl)amidoborane(2-iso-propyl,4-[3',5'-bis-trifluoromethylphenyl]indenyl)$_2$$\eta^4$-1,4-diphenyl-1,3-butadiene;
bis(trimethylsilyl)amidoborane(2-n-butyl,4-[3',5'-bis-trifluoromethylphenyl]indenyl)$_2$$\eta^4$-1,4-diphenyl-1,3-butadiene;
bis(trimethylsilyl)amidoborane(2-iso-butyl,4-[3',5'-bis-trifluoromethylphenyl]indenyl)$_2$$\eta^4$-1,4-diphenyl-1,3-butadiene;
bis(trimethylsilyl)amidoborane(2-sec-butyl,4-[3',5'-bis-trifluoromethylphenyl]indenyl)$_2$$\eta^4$-1,4-diphenyl-1,3-butadiene;
bis(trimethylsilyl)amidoborane(2-tert-butyl,4-[3',5'-bis-trifluoromethylphenyl]indenyl)$_2$$\eta^4$-1,4-diphenyl-1,3-butadiene;
bis(trimethylsilyl)amidoborane(2-ethyl,4-[3',5'-di-iso-propylphenyl]indenyl)$_2$$\eta^4$-1,4-diphenyl-1,3-butadiene;
bis(trimethylsilyl)amidoborane(2-n-propyl,4-[3',5'-di-iso-propylphenyl]indenyl)$_2$$\eta^4$-1,4-diphenyl-1,3-butadiene;
bis(trimethylsilyl)amidoborane(2-iso-propyl,4-[3',5'-di-iso-propylphenyl]indenyl) $\eta^4$-1,4-diphenyl-1,3-butadiene;
bis(trimethylsilyl)amidoborane(2-n-butyl,4-[3',5'-di-iso-propylphenyl]indenyl)$_2$$\eta^4$-1,4-diphenyl-1,3-butadiene;
bis(trimethylsilyl)amidoborane(2-iso-butyl,4-[3',5'-di-iso-propylphenyl]indenyl)$_2$$\eta^7$-1,4-diphenyl-1,3-butadiene;
bis(trimethylsilyl)amidoborane(2-sec-butyl,4-[3',5'-di-iso-propylphenyl]indenyl)$_2$$\eta^4$-1,4-diphenyl-1,3-butadiene;
bis(trimethylsilyl)amidoborane(2-tert-butyl,4-[3',5'-di-iso-propylphenyl]indenyl)$_2$$\eta^4$-1,4-diphenyl-1,3-butadiene;
bis(trimethylsilyl)amidoborane(2-methyl,4-[3',5'-di-phenylphenyl]indenyl)$_2$$\eta^4$-1,4-diphenyl-1,3-butadiene;
bis(trimethylsilyl)amidoborane(2-ethyl,4-[3',5'-di-phenylphenyl]indenyl)$_2$$\eta^4$-1,4-diphenyl-1,3-butadiene;
bis(trimethylsilyl)amidoborane(2-n-propyl,4-[3',5'-di-phenylphenyl]indenyl)$_2$$\eta^4$-1,4-diphenyl-1,3-butadiene;
bis(trimethylsilyl)amidoborane(2-iso-propyl,4-[3',5'-di-phenylphenyl]indenyl)$_2$$\eta^4$-1,4-diphenyl-1,3-butadiene;
bis(trimethylsilyl)amidoborane(2-n-butyl,4-[3',5'-di-phenylphenyl]indenyl)$_2$$\eta^4$-1,4-diphenyl-1,3-butadiene;
bis(trimethylsilyl)amidoborane(2-iso-butyl,4-[3',5'-di-phenylphenyl]indenyl)$_2$$\eta^4$-1,4-diphenyl-1,3-butadiene;
bis(trimethylsilyl)amidoborane(2-sec-butyl,4-[3',5'-di-phenylphenyl]indenyl)$_2$$\eta^4$-1,4-diphenyl-1,3-butadiene;
bis(trimethylsilyl)amidoborane(2-tert-butyl,4-[31,5'-di-phenylphenyl]indenyl)$_2$$\eta^4$-1,4-diphenyl-1,3-butadiene;
bis(trimethylsilyl)amidoborane(2-methyl,4-[3',5'-di-tbutylphenyl]indenyl)$_2$zirconium dimethyl;
bis(trimethylsilyl)amidoborane(2-ethyl,4-[3',5'-di-tbutylphenyl]indenyl)$_2$zirconium dimethyl;
bis(trimethylsilyl)amidoborane(2-n-propyl,4-[3',5'-di-tbutylphenyl]indenyl)$_2$zirconium dimethyl;
bis(trimethylsilyl)amidoborane(2-iso-propyl,4-[3',5'-di-tbutylphenyl]indenyl)$_2$zirconium dimethyl;
bis(trimethylsilyl)amidoborane(2-n-butyl,4-[3',5'-di-tbutylphenyl]indenyl)$_2$zirconium dimethyl;
bis(trimethylsilyl)amidoborane(2-iso-butyl,4-[3',5'-di-tbutylphenyl]indenyl)$_2$zirconium dimethyl;
bis(trimethylsilyl)amidoborane(2-sec-butyl,4-[3',5'-di-tbutylphenyl]indenyl)$_2$zirconium dimethyl;
bis(trimethylsilyl)amidoborane(2-tert-butyl,4-[3',5'-di-tbutylphenyl]indenyl)$_2$zirconium dimethyl;
bis(trimethylsilyl)amidoborane(2-ethyl,4-[3',5'-bis-trifluoromethylphenyl]indenyl)$_2$zirconium dimethyl;
bis(trimethylsilyl)amidoborane(2-n-propyl,4-[3',5'-bis-trifluoromethylphenyl]indenyl)$_2$zirconium dimethyl;
bis(trimethylsilyl)amidoborane(2-iso-propyl,4-[3',5'-bis-trifluoromethylphenyl]indenyl)$_2$zirconium dimethyl;
bis(trimethylsilyl)amidoborane(2-n-butyl,4-[3',5'-bis-trifluoromethylphenyl]indenyl)$_2$zirconium dimethyl;
bis(trimethylsilyl)amidoborane(2-iso-butyl,4-[3',5'-bis-trifluoromethylphenyl]indenyl)$_2$zirconium dimethyl;
bis(trimethylsilyl)amidoborane(2-sec-butyl,4-[3',5'-bis-trifluoromethylphenyl]indenyl)$_2$zirconium dimethyl;
bis(trimethylsilyl)amidoborane(2-tert-butyl,4-[3',5'-bis-trifluoromethylphenyl]indenyl)$_2$zirconium dimethyl;
bis(trimethylsilyl)amidoborane(2-ethyl,4-[3',5'-di-iso-propylphenyl]indenyl)$_2$zirconium dimethyl;
bis(trimethylsilyl)amidoborane(2-n-propyl,4-[3',5'-di-iso-propylphenyl]indenyl)$_2$zirconium dimethyl
bis(trimethylsilyl)amidoborane(2-iso-propyl,4-[3',5'-di-iso-propylphenyl]indenyl)$_2$zirconium dimethyl;
bis(trimethylsilyl)amidoborane(2-n-butyl,4-[3',5'-di-iso-propylphenyl]indenyl)$_2$zirconium dimethyl;
bis(trimethylsilyl)amidoborane(2-iso-butyl,4-[3',5'-di-iso-propylphenyl]indenyl)$_2$zirconium dimethyl;
bis(trimethylsilyl)amidoborane(2-sec-butyl,4-[3',5'-di-iso-propylphenyl]indenyl)$_2$zirconium dimethyl;
bis(trimethylsilyl)amidoborane(2-tert-butyl,4-[3',5'-di-iso-propylphenyl]indenyl)$_2$zirconium dimethyl;
bis(trimethylsilyl)amidoborane(2-methyl,4-[3',5'-di-phenylphenyl]indenyl)$_2$zirconium dimethyl;
bis(trimethylsilyl)amidoborane(2-ethyl,4-[3',5'-di-phenylphenyl]indenyl)$_2$zirconium dimethyl;
bis(trimethylsilyl)amidoborane(2-n-propyl,4-[3',5'-di-phenylphenyl]indenyl)$_2$zirconium dimethyl;
bis(trimethylsilyl)amidoborane(2-iso-propyl,4-[3',5'-di-phenylphenyl]indenyl)$_2$zirconium dimethyl;
bis(trimethylsilyl)amidoborane(2-n-butyl,4-[3',5'-di-phenylphenyl]indenyl)$_2$zirconium dimethyl;
bis(trimethylsilyl)amidoborane(2-iso-butyl,4-[3',5'-di-phenylphenyl]indenyl)$_2$zirconium dimethyl;
bis(trimethylsilyl)amidoborane(2-sec-butyl,4-[3',5'-di-phenylphenyl]indenyl)$_2$zirconium dimethyl; and
bis(trimethylsilyl)amidoborane(2-tert-butyl,4-[3',5'-di-phenylphenyl]indenyl)$_2$zirconium dimethyl.

Activators

The terms "cocatalyst" and "activator" are used herein interchangeably and are defined to be any compound or component which can activate a bulky ligand transition metal compound, e.g., any of the metallocenes defined above. Alumoxane may be used as an activator. A variety of methods can be used for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane.

A cloudy or gelled alumoxane can be filtered to produce a clear solution or clear alumoxane can be decanted from the cloudy solution.

Also useful in the described processes are ionizing activators, neutral or ionic, or compounds such as dimethylanilinium tetrakis(perfluorophenyl)boron and tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated for use in the process, for example, alumoxane and ionizing activators in combinations, see for example, WO 94/07928. In preferred embodiments of the process, dimethylanilinium tetrakis(perfluorophenyl)boron is used to activate the metallocene compound, e.g., by affixing the dimethylanilinium tetrakis (perfluorophenyl)boron to the support, together with the metallocene compound. In preferred embodiments, the support is a silica compound.

Descriptions of ionic catalysts for coordination polymerization comprised of metallocene cations activated by non-coordinating anions appear in EP-A-0 277 003, EP-A-0 277 004 and U.S. Pat. No. 5,198,401 and WO-A-30 92/00333 (incorporated herein by reference). These teach a preferred method of preparation wherein metallocenes are protonated by an anion precursor such that an alkyl/hydride group is abstracted from a transition metal to make it both cationic and charge-balanced by the non-coordinating anion.

The term "noncoordinating anion" means an anion which either does not coordinate to a cation or which is only weakly coordinated to a cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this disclosure are those which are compatible, stabilize the metallocene cation in the sense of balancing its ionic charge in a +1 state, yet retain sufficient liability to permit displacement by an ethylenically or acetylenically unsaturated monomer during polymerization.

The use of ionizing ionic compounds not containing an active proton but capable of producing both the active metallocene cation and an noncoordinating anion is also known, see, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl)boron, see, EP-A-0 520 732 (incorporated herein by reference). Ionic catalysts for addition polymerization can also be prepared by oxidation of the metal centers of transition metal compounds by anion precursors containing metallic oxidizing groups along with the anion groups. See, EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See, EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Preferred activators for use in this invention include: trimethylammonium tetraphenylborate, triethylammonium tetraphenylborate, tripropylammonium tetraphenylborate, tri(n-butyl)ammonium tetraphenylborate, tri(tert-butyl) ammonium tetraphenylborate, N,N-dimethylanilinium tetraphenylborate, N,N-diethylanilinium tetraphenylborate, N,N-dimethyl-(2,4,6-trimethylanilinium)tetraphenylborate, trimethylammonium tetrakis(pentafluorophenyl)borate, triethylammonium tetrakis (pentafluorophenyl)borate, tripropylammonium tetrakis (pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis (pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl)borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis (perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis (perfluorobiphenyl)borate, trimethylammonium tetrakis (3,5-bis(trifluoromethyl)phenyl)borate,
triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis (3,5-bis(trifluoromethyl)phenyl)borate, tri(tert-butyl) ammonium tetrakis(3,5-bis(trifluoromethyl)phenyl) borate, N,N-dimethylanilinium tetrakis(3,5-bis (trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, di-(iso-propyl)ammonium tetrakis(pentafluorophenyl)borate, dicyclohexylammonium tetrakis(pentafluorophenyl)borate; tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis (pentafluorophenyl)borate, triphenylphosphonium tetrakis(pentafluorophenyl)borate, triethylsilylium tetrakis(pentafluorophenyl)borate, benzene(diazonium) tetrakis (pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene (diazonium)tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene (diazonium) tetrakis(perfluoronaphthyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis (perfluorobiphenyl)borate, tropillium tetrakis(3,5-bis(trifluoromethyl)phenyl)borate, triphenylcarbenium tetrakis (3,5-bis(trifluoromethyl)phenyl)borate, triphenylphosphonium tetrakis(3,5-bis(trifluoromethyl) phenyl)borate, triethylsilylium tetrakis(3,5-bis(trifluoromethyl)phenyl)borate, and benzene(diazonium)tetrakis (3,5-bis(trifluoromethyl)phenyl)borate. Most preferably, the activator is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, and/or triphenylcarbenium tetra(perfluorophenyl)borate.

Activators

The terms "cocatalyst" and "activator" are used herein interchangeably and are defined to be any compound or component which can activate a bulky ligand transition metal compound, e.g., any of the metallocenes defined above. Alumoxane may be used as an activator. A variety of methods can be used for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

Also useful in the described processes are ionizing activators, neutral or ionic, or compounds such as dimethylanilinium tetrakis(perfluorophenyl)boron (DICOP) and tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated for use in the process, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-30 92/00333 (incorporated herein by reference). These teach a preferred method of preparation wherein metallocenes (bisCp and monoCp) are protonated by an anion precursor such that an alkyl/hydride group is abstracted from a transition metal to make it both cationic and charge-balanced by the non-coordinating anion.

The term "noncoordinating anion" means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this disclosure are those which are compatible, stabilize the metallocene cation in the sense of balancing its ionic charge in a +1 state, yet retain sufficient liability to permit displacement by an ethylenically or acetylenically unsaturated monomer during polymerization.

The use of ionizing ionic compounds not containing an active proton but capable of producing both the active metallocene cation and an noncoordinating anion is also known. See, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl)boron. See, EP-A-0 520 732 (incorporated herein by reference). Ionic catalysts for addition polymerization can also be prepared by oxidation of the metal centers of transition metal compounds by anion precursors containing metallic oxidizing groups along with the anion groups. See, EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See, EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Catalyst Supports

The metallocenes referenced herein may be supported using a porous particulate material, such as for example, talc, inorganic oxides, inorganic chlorides and resinous materials such as polyolefin or polymeric compounds.

Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 µm. More preferably, the surface area is in the range of from about 50 to about 500 m²/g, the pore volume is in the range of from about 0.5 to about 3.5 cc/g and the average particle size is in the range of from about 20 to about 200 µm. Most preferably the surface area is in the range of from about 100 to about 400 m²/g, the pore volume is in the range of from about 0.8 to about 3.0 cc/g and the average particle size is in the range of from about 30 to about 100 µm. The average pore size of typical porous support materials is ≧10 Å. Preferably, a support material is used that has an average pore diameter of ≧50 Å and most preferably it is in the range of from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be preactivated separately and then combined with the support material either separately or together. If the metallocenes and activator are separately supported, then preferably, they are dried then combined as a powder before use in polymerization. Regardless of whether the metallocene and activator are separately precontacted or whether the metallocene and activator are combined at once, two or more metallocene compounds may be supported together (co-deposit) or separately (physical blend).

The total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, Experimental Methods in Catalyst Research, Academic Press, 1968, pages 67-96.

Methods of supporting ionic catalysts including metallocene cations and noncoordinating anions are described in WO 91/09882, WO 94/03506, WO 96/04319 and U.S. Pat. No. 5,643,847 (incorporated herein by reference). The methods generally include either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. The supported catalyst is typically added to the polymerization medium as a suspension in mineral oil. For details regarding prepolymerization, see U.S. Pat. Nos. 4,923,833 and 4,921,825, EP 0 279 863 and EP 0 354 893 each of which is fully incorporated herein by reference.

For preparation of the branched polypropylene, preactivation of the metallocene may be advantageous. For example, it is widely known in the art that preactivation of the metallocene before addition to a continuous reactor yields higher activities than continuous addition of metallocene and activator in two separate streams. Furthermore, it may be advantageous to control precontacting time to maximize catalyst effectiveness, e.g., avoiding excessive aging of the activated catalyst composition.

Monomers

The process described herein may be used for the polymerization of propylene and one or more comonomers. Typical comonomers monomers include olefins having from 4 to 30 carbon atoms, preferably 4-12 carbon atoms, and more preferably 4 to 8 carbon atoms. Useful monomers include linear, branched or cyclic olefins; linear, branched or cyclic alpha olefins; linear, branched or cyclic diolefins; linear, branched or cyclic alpha-omega olefins; linear, branched or cyclic polyenes; and linear, branched or cyclic alpha olefins.

In a preferred embodiment the polymer produced herein is a propylene homopolymer or copolymer. The comonomer is preferably a C4 to C20 linear, branched or cyclic monomer, and in one embodiment is a C4 to C12 linear or branched alpha-olefin, preferably butene, pentene, hexene, heptene, octene, nonene, decene, dodecene, 4-methyl-pentene-1,3-methyl pentene-1,5-ethyl-1-nonene, 3,5,5-trimethyl-hexene-1, norbornene, norbornadiene, vinyl norbornene, ethylidene norbornene, and the like. Ethylene may be present at 5 mol % or less.

In another embodiment the polymer produced herein is a copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Useful comonomers also include aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also useful as comonomers. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

In a preferred embodiment the polymer comprises less than 3 weight % ethylene, preferably less than 2.5 weight %, preferably less than 2 weight %, preferably less than 1.5 weight %, preferably less than 1 weight %, preferably less than 0.75 weight %, preferably 0.5 weight %, preferably less than 0.25 weight %, preferably less than 0.15 weight %, preferably less than 0.1 weight Reactors The processes described herein may be used for the polymerization of propylene in high-pressure reactors. The most general requirement for a suitable reactor is that the reactor must be substantially unreactive with the polymerization reaction components. Likewise, the reactor must be able to withstand the high pressures and temperatures that occur during the polymerization reaction. Such reactors are known as high-pressure reactors for purposes of this disclosure. Withstanding these high pressures and temperatures will allow the reactor to maintain the propylene under supercritical conditions. Suitable reaction vessels include those known in the art to maintain supercritical or other high-pressure ethylene polymerization reactions. Suitable reactors are selected from autoclave, tubular, and autoclave/tubular reactors. For purposes of this disclosure, high temperature and pressure are defined as temperatures and pressures greater than the reaction medium's critical point. Invention processes typically use bulk propylene as the reaction medium. Typically, invention polymerization processes are operated such that the reaction medium is at high enough temperatures and pressures so that the medium is in a supercritical state.

In a preferred embodiment the process described herein may be used in autoclave and or tubular reactors. Typically, autoclave reactors have length-to-diameter ratios of 1:1 to 20:1 and are fitted with a high-speed (up to 1500 RPM) multiblade stirrer.

Autoclave pressures are typically greater than 6 MPa. Coupled with these, maximum autoclave pressures are typically less than 260 MPa. When the autoclave has a low length-to-diameter ratio (such as less than 4) propylene and other monomers are typically injected at only one position. But injection at two or more positions in the autoclave is also possible. For instance, in reactors where the length-to-diameter ratio is around 4-20, the reactor can contain up to six different injection positions.

Additionally, in the larger (longer) autoclaves, one or more lateral fixing devices support the high-speed stirrer. These fixing devices can also divide the autoclave into two or more zones. Mixing blades on the stirrer can differ from zone to zone to allow for plug flow or back mixing, largely independently, in the separate zones. Two or more autoclaves with one or more zones can connect in series to tailor polymer structure.

A tubular reactor is another reactor type capable of operating up to about 350 MPa. It is fitted with external cooling and one or more injection points along the (tubular) reaction zone. As in autoclaves, these injection points serve as entry points for propylene, one or more comonomer, catalyst, or mixtures of these. In tubular reactors, external cooling allows for increased monomer conversion relative to an autoclave, where the low surface-to-volume ratio hinders any significant heat removal. Tubular reactors have a special outlet valve that can send a pressure shockwave backward along the tube. The shockwave helps dislodge any polymer residue that has formed on reactor walls during operation.

Another way of dealing with wall deposits is to fabricate the tube with smooth, polished internal surfaces Tubular reactors can operate at pressures up to 360 MPa. They have lengths of 100-2000 meters and internal diameters usually less than 10 cm.

Reactors that pair autoclaves with tubular reactors can also serve in invention processes. In such instances, the autoclave typically precedes the tubular reactor. Such systems may have injection of additional catalyst and/or feed components at several points in the autoclave and more particularly along the tube length.

In both autoclaves and tubular reactors, feeds are injected at or below room temperature to provide maximum polymer production within the limits of maximum operating temperature or within product specifications. In autoclave operation, a preheater operates at startup, but not after the reaction reaches steady state if the first mixing zone has some back-mixing characteristics. In tubular reactors, the feed is first heated in a preheater or prewarmer before passing into the cooled section where reaction takes place.

In both multizone autoclaves and tubular reactors, catalyst can not only be injected at the inlet, but also optionally at one or more points along the reactor. The catalyst feeds injected at the inlet and other injection points can be the same or different in terms of content, density, concentration, etc. Choosing different catalyst feeds allows polymer design tailoring.

The autoclave or tubular reactor effluent is depressurized on entering the high pressure separator (HPS).

At the reactor outlet valve the pressure drops to begin the separation of polymer and unreacted monomer, co-monomers, propane, etc. The temperature in this vessel is typically maintained above the polymer product's crystallization point but the pressure may be below the critical point. The pressure need only be high enough that the propylene can be condensed against standard cooling water. The liquid recycle stream can then be recycled to the reactor with a liquid pumping system instead of the hyper-compressors required for Polyethylene units. The relatively low pressure in this separator will reduce the monomer concentration in the liquid polymer phase which will result in a much lower polymerization rate. This polymerization rate may be low enough to operate this system without adding a catalyst poison or "killer". If no poison is added to the system then the recycle stream will not require treating before it can be fed back to the reactors If however a catalyst killer is required (e.g., to prevent reactions in the high pressure recycle) then provision is preferably made to remove any potential catalyst poisons from the recycled propylene rich monomer stream e.g. by the use of fixed bed adsorbents or by scavenging with an aluminum alkyl.

Alternatively, the HPS may be operated over propylene's critical pressure but within the propylene/polypropylene two phase region. This is an economically preferred method if polypropylene is to be produced with a revamped HPPE plant. The recycled HPS overhead is cooled and dewaxed before being returned to the suction of the secondary compressor, which is typical of HPPE plant operation.

The polymer from this intermediate or high pressure vessel will then go through another pressure reduction step to a low pressure separator.

In addition to autoclave reactors, tubular reactors, or reactors combining these, loop-type reactors may be used with the process of this invention as well. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop.

Industrially a loop reactor is not operated at the high pressures encountered in autoclaves and tubes. One version of the PP process operates in a supercritical region but below the cloud point curve of the polymer and at temperatures below the polymer crystallization point. Thus the polymer is present as a slurry with the temperature below the melting point of the polymer to avoid fouling deposition of polymer on the wall thereby reducing heat exchange.

Commercial low pressure loop reactors typically have diameters of 16 to 24 inches and lengths of 100 to 200+ meters. Operation in a single supercritical polypropylene in propylene solution phase typically uses pressures of greater than 25 to 30 MPa. At these pressures smaller diameter thicker wall loop tubing is generally used resulting in potential difficulties in pump around efficiency and maximum allowable reactor capacity.

In another embodiment, the processes of this invention may be used in the reactor systems described in U.S. Pat. No. 6,355,741, which discloses a reactor with at least two loops. Invention processes can be used with these two-loop reactors especially, if at least one of the loops uses invention supercritical conditions.

Reaction Conditions

Preferred residence time in high pressure reactors are generally in the range of 15 minutes or less, preferably 10 minutes or less, preferably 5 minutes or less, more preferably between 30 seconds and 5 minutes.

Feed inlet temperatures are generally at or below room temperature to provide cooling to the exothermic reaction in the reactor operating above the crystallization temperature of the polymer product.

Propylene and higher olefins are far less susceptible to temperature runaway and explosive decomposition than ethylene, so potentially a higher maximum reactor operating temperature can be tolerated but within the limits of catalyst activity, molecular weight and isotacticity requirements of the products.

Pressure

Two phase operation is preferred for production of polymers containing more long chain branching since a metallocene catalytic complex may be preferentially soluble in the polymer rich phase allowing chain end incorporation of the terminally unsaturated polypropylene based chains in subsequent copolymerizations in a propylene starved medium.

Branching may also be favored by running the reaction to conversions above 30%.

Comonomers, Dual Catalysts and Polymer Structure

In reactors with multiple injection points for catalyst and feed there exists the possibility to tailor the polymer design. Use of more than one catalyst having different molecular weight and structural capabilities allows a wide variety of product compositions (e.g. bimodal, linear mixed with long chain branched).

The various olefins will have differing reactivity ratios for a given catalyst so a plug flow type operation will allow compositional tapering if, for instance, no feeds are injected down the reactor or compensation of the tapering if the more reactive monomer is injected preferentially along the tube. Operation of two autoclaves in series or parallel can allow the use of tailoring by altering the composition of fresh feed to the second reactor.

Catalyst Killing

The reactor effluent is depressurized to an intermediate pressure significantly below the cloud point pressure but nevertheless supercritical for that composition. This allows separation of a polymer rich phase for further purification and a propylene rich phase for recycle compression back to the reactor.

This separation is carried out in a vessel known as a high pressure separator (HPS). Since this vessel also has a significant residence time, the catalyst activity is typically killed by addition of a polar species such as water, alcohol or sodium/calcium stearate. The choice and quantity of killing agent will depend on the requirements for clean up of the recycle propylene and comonomers as well as the product properties, if the killing agent has low volatility.

Alternatively the intermediate separation can be done at pressures well below the critical point so that the monomer concentration and therefore reactivity in the high pressure separator is relatively low. The relatively small amount of continued polymerization in this vessel may not be a problem, so addition of catalyst deactivating compounds may be avoided presuming that no undesired reactions occur in the high or intermediate pressure recycle system. If no killing compounds are added then the killer removal step can be eliminated.

Choice of Propylene Feed Purity

Propylene is available commercially at two levels of purity—polymer grade at 99.5% and chemical grade at about 93 to 95%. The choice of feed will set the level of purge required from the recycle to avoid over dilution of the feed by inert propane. The presence of propane in the reactor and HPS will raise the pressure of the cloud point curve for a given temperature but will decrease the polymerization efficiency due to a decrease in propylene (and other olefin) concentrations in the reactor. The elevation of cloud point pressure due to propane will widen the operating window of the HPS. In copolymerizations of propylene with limited amounts of ethylene, a similar effect in raising the cloud point pressure will be noted due to the presence of low levels of ethylene in the HPS.

Low Pressure Separator Operation

The LPS running at just above atmospheric pressure is a sub critical flash of light components, reactants and oligomers thereof, for the purpose of producing a low volatile containing polymer melt entering the finishing extruder or static mixer.

APPLICATIONS

The polymer compositions of this invention (and blends thereof as described above) may be used in any known thermoplastic or elastomer application. Examples include uses in molded parts, films, tapes, sheets, tubing, hose, sheeting, wire and cable coating, adhesives, shoesoles, bumpers, gaskets, bellows, films, fibers, elastic fibers, nonwovens, spunbonds, sealants, surgical gowns and medical devices.

Adhesives

The polymers of this invention or blends thereof can be used as adhesives, either alone or combined with tackifiers. Preferred tackifiers are described above. The tackifier is typically present at about 1 weight % to about 50 weight %, based upon the weight of the blend, more preferably 10 weight % to 40 weight %, even more preferably 20 weight % to 40 weight %. Other additives, as described above, may be added also.

The adhesives of this invention can be used in any adhesive application, including but not limited to, disposables, packaging, laminates, pressure sensitive adhesives, tapes labels, wood binding, paper binding, non-wovens, road marking, reflective coatings, and the like. In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another embodiment the layer comprising the polyolefin composition of this invention (and/or blends thereof) may be combined with one or more other layers. The other layer(s) may be any layer typically included in multilayer film structures. For example the other layer or layers may be:

1. Polyolefins

Preferred polyolefins include homopolymers or copolymers of C2 to C40 olefins, preferably C2 to C20 olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar Polymers

Preferred polar polymers include homopolymers and copolymers of esters, amides, acetates, anhydrides, copolymers of a C2 to C20 olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic Polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous

Other preferred layers can be paper, wood, cardboard, metal, metal foils (such as aluminum foil and tin foil), metallized surfaces, glass (including silicon oxide (SiO.x) coatings applied by evaporating silicon oxide onto a film surface), fabric, spunbonded fibers, and non-wovens (particularly polypropylene spun bonded fibers or non-wovens), and substrates coated with inks, dyes, pigments, and the like.

The films may vary in thickness depending on the intended application, however films of a thickness from 1 to 250 μm are usually suitable. Films intended for packaging are usually from 10 to 60 micron thick. The thickness of the sealing layer is typically 0.2 to 50 μm. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads.

In another embodiment one more layers may be modified by corona treatment, electron beam irradiation, gamma irradiation, or microwave irradiation. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. Preferred hydrocarbon resins include those described above. The films comprising a hydrocarbon resin may be oriented in uniaxial or biaxial directions to the same or different degrees.

Molded Products

The polyolefin composition described above may also be used to prepare the molded products of this invention in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, Concise Encyclopedia of Polymer Science and Engineering 90-92 (Jacqueline I. Kroschwitz, ed., John Wiley & Sons 1990).

The polymer compositions described above may also be used to prepare nonwoven fabrics and fibers in any nonwoven fabric and fiber making process, including but not limited to, melt blowing, spunbonding, film aperturing, and staple fiber carding. A continuous filament process may also be used. Preferably a spunbonding process is used. The spunbonding process involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding. The fabric may be prepared with mixed metallocene polypropylene alone, physically blended with other mixed metallocene polypropylene or physically blended with single metallocene polypropylene. Likewise the fabrics of this invention may be prepared with mixed metallocene polypropylene physically blended with conventional Ziegler-Natta produced polymer. If blended, the fabric of this invention is preferably comprised of at least 50% mixed metallocene polypropylene. With these nonwoven fabrics, manufacturers can maintain the desirable properties of fabrics prepared with metallocene produced polypropylene while increasing fabric strength and potentially increased line speed compared to fabrics made using conventional polymers.

EXAMPLES

Example 1

In the following example, various samples of polypropylene copolymers and terpolymers were formed using a metallocene catalyst. The properties of the samples are reflected in Tables 1 and 2.

Each sample was formed using a supported metallocene catalyst. The metallocene catalyst used was dimethylsilylbis (2-methyl indenyl)zirconium dichloride, purchased from the Boulder Scientific Company, with methylalumoxane (MAO) activator. The metallocene catalyst was prepared by placing the metallocene catalyst in a 100-ml beaker to which the 30 wt % MAO solution was added. The mixture was stirred magnetically for 1 hr. and was diluted with 10 g toluene. Five grams of Davison MS952 silica, pre-calcined at 600° C. was placed in a 250 ml beaker separately. One-fourth of the metallocene mixture was added to the silica and the resulting mixture was stirred manually to homogeneity and uniform color. The rest of the metallocene mixture was also added to the silica as above to achieve a mobile slurry. The entire mixture was transferred to a 250 ml round-bottom flask, and was dried under vacuum. The yield was calculated and the metal loading was analyzed. A pre-mixed diene in hexane solution (1 ml+9 ml) was used as the comonomer feed.

Sample 1 is a polypropylene homopolymer. Sample 2 is a polypropylene copolymer made from 1,000 ml of propylene and 1 ml of diluted 7-methyl-1,6-octadiene (MOD). Sample 3 is a polypropylene copolymer made from 1,000 ml of propylene and 2 ml of diluted MOD. Sample 4 is a polypropylene copolymer made from 1,000 ml of propylene and 3 ml of diluted MOD. Sample 5 is a polypropylene copolymer made from 1,000 ml of propylene and 1 ml of diluted 1,9-decadiene (DD). Sample 6 is a polypropylene copolymer made from 1,000 ml of propylene and 2 ml of diluted DD. Sample 7 is a polypropylene copolymer made from 1,000 ml of propylene and 3 ml of diluted DD. Sample 8 is a polypropylene terpolymer made from 1,000 ml of propylene, 1 ml of diluted MOD, and 2 ml DD. Sample 9 is a polypropylene terpolymer made from 1,000 ml of propylene, 2 ml of diluted MOD, and 1 ml diluted DD.

The polymerizations were each conducted separately in a 2 L batch reactor at a reactor temperature of 70° C. with the stirrer set at 800 rpm. Each reactor contained a total of 1000 ml of propylene and amounts of diluted diene ranging from 1 ml to 3 ml. The propylene was added in two stages. Triethyl aluminum scavenger (1 ml, 1 M solution in hexane) was charged to the reactor through a stainless steel tube. Diluted diene (9 ml of hexane per 1 ml of diene) was added to the reactor. Then, 800 ml of propylene was charged to the reactor. The reactor was heated to 70° C. and maintained at a reactor pressure from 180 psig to 210 psig. The supported catalyst (400 mg in 2 ml hexane) was flushed with 200 ml propylene and high pressure $N_2$ and injected into the reactor. The reactor was run for 15 minutes and then cooled to 25° C. and vented. Each polymerization reaction yielded a polypropylene sample. The polypropylene polymer was washed with hexane then dried by $N_2$ purge overnight and then weighed. Each sample was characterized using H NMR, DSC, MFR, GPC-3D and HS-GC methods.

TABLE 1

| Samples | 1 | 2 | 3 | 4 |
|---|---|---|---|---|
| Monomers | $C_3$ | $C_3$/MOD | $C_3$/MOD | $C_3$/MOD |
| Diene Content (MOD/DD, ppm) | 0/0 | 1265/0 | 1887/0 | 2831/0 |
| Yield (g) | 70.0 | 54.0 | 70.5 | 68.5 |
| MFR | 30 | 38 | 18 | 30 |
| H NMR Data % Trisubstituted | 10 | 37 | 15 | 10 |
| Chain End % Vinyl | 7 | 24 | 12 | 10 |
| Unsaturation % Vinylidiene | 83 | 39 | 73 | 80 |
| Temperature $T_m$ ° C. | 143 | 144 | 142 | 145 |
| $T_c$ ° C. | 103 | 104 | 103 | 105 |
| Diene Feed Conc. (MOD/DD, mg) | 0/0 | 75.3/0 | 150.6/0 | 225.9/0 |
| Unreacted Diene (MOD/DD, mg) | 0/0 | 6.97/0 | 17.55/0 | 31.99/0 |
| Reacted Diene (MOD/DD, mg) | 0/0 | 68.33/0 | 133.05/0 | 193.91/0 |

TABLE 1-continued

| Samples | 1 | 2 | 3 | 4 |
|---|---|---|---|---|
| % Diene Conversion (MOD/DD) | 0/0 | 90.7/0 | 88.4/0 | 85.8/0 |

TABLE 2

| Samples | 5 | 6 | 7 | 8 | 9 |
|---|---|---|---|---|---|
| Monomers | $C_3$/DD | $C_3$/DD | $C_3$/DD | $C_3$/MOD/DD | $C_3$/MOD/DD |
| Diene Content (MOD/DD, ppm) | 0/991 | 0/1821 | 0/3444 | 1036/1943 | 2024/948 |
| Yield, g | 65.0 | 67.5 | 56.0 | 66.0 | 66.5 |
| MFR | 27 | 13 | 3 | 16 | 25 |
| H NMR Data % Trisubstituted | 6 | 7 | 0 | 11 | 17 |
| Chain End % Vinyl Unsaturation | 9 | 10 | 10 | 9 | 11 |
| % Vinylidiene | 85 | 83 | 90 | 80 | 72 |
| Temperature | | | | | |
| $T_m$ ° C. | 145 | 142 | 142 | 142 | 144 |
| $T_c$ ° C. | 105 | 104 | 102 | 102 | 104 |
| Diene Feed Conc. (MOD/DD, mg) | 0/75.0 | 0/150.0 | 0/225.0 | 75.3/150.0 | 150.6/75.0 |
| Unreacted Diene (MOD/DD, mg) | 0/9.56 | 0/27.07 | 0/32.14 | 6.93/21.78 | 16.03/11.97 |
| Reacted Diene (MOD/DD, mg) | 0/65.44 | 0/122.93 | 0/192.86 | 68.37/128.22 | 34.57/63.03 |
| % Diene Conversion (MOD/DD) | 0/87.3 | 0/82.0 | 0/85.7 | 90.8/85.5 | 89.4/84.04 |

What is claimed is:

1. A polymer composition that includes a branched crystalline diene-modified polypropylene random terpolymer having propylene units; first diene units; second diene units; from 0.0 wt % to 2.0 wt % ethylene units; and a heat of fusion of 30 J/g or more, wherein the first diene units are derived from 2-methyl-1.5-hexadiene monomer or α, internal nonconjugated diene monomers and the second diene units are derived from α, ω non-conjugated diene monomers, each having 5 or more carbon atoms, wherein the branched crystalline polypropylene has a Branching Index of 0.95 or less.

2. The polymer composition of claim 1, in which the random polypropylene terpolymer comprises at least 30% and no more than 95% propylene units; at least 5% and no more than 65% first diene units; at least 0.001% and no more than 2.00% second diene units; and from 0.0 mol % to 3.0 mol % ethylene units.

3. The polymer composition of claim 1, in which the branched crystalline polypropylene has a Branching Index of 0.90 or less.

4. The polymer composition of claim 1, in which the first diene units are present in the polypropylene terpolymer in an amount of from 0.0005 mol % to 10 mol %.

5. The polymer composition of claim 1, in which the first diene units are present in the polypropylene terpolymer in an amount of from 0.005 mol % to 1 mol %.

6. The polymer composition of claim 1, in which the first diene units are derived from 7-methyl-1,6-octadiene.

7. The polymer composition of claim 1, in which the branched final crystalline polypropylene has a crystallization temperature (Tc) of 50° C. or more.

8. The polymer composition of claim 1, in which the branched crystalline polypropylene has a crystallization temperature (Tc) of 75° C. or more.

9. The polymer composition of claim 1, in which the branched crystalline polypropylene has a crystallization temperature (Tc) of 100° C. or more.

10. The polymer composition of claim 1, in which the branched crystalline polypropylene has a crystallization temperature (Tc) of 110° C. or more.

11. The polymer composition of claim 1, in which the branched crystalline polypropylene has a crystallization temperature (Tc) of from 50° C. to 115° C.

12. The polymer composition of claim 1, in which the branched crystalline polypropylene has a melting point (Tm) of 75° C. or more.

13. The polymer composition of claim 1, in which the branched crystalline polypropylene has a melting point (Tm) of 100° C. or more.

14. The polymer composition of claim 1, in which the branched crystalline polypropylene has a melting point (Tm) of 125° C. or more.

15. The polymer composition of claim 1, in which the branched crystalline polypropylene has a melting point (Tm) of 150° C. or more.

16. The polymer composition of claim 1, in which the branched crystalline polypropylene has a melting point (Tm) of 160° C. or more.

17. The polymer composition of claim 1, in which the branched crystalline polypropylene has a melting point (Tm) of from 75° C. to 160° C.

18. The polymer composition of claim 1, in which the branched crystalline polypropylene has a melt flow rate of 0.01 or more.

19. The polymer composition of claim 1, in which the branched crystalline polypropylene has a melt flow rate of 0.1 or more.

20. The polymer composition of claim 1, in which the branched crystalline polypropylene has a melt flow rate of 0.5 or more.

21. The polymer composition of claim 1, in which the branched crystalline polypropylene has a melt flow rate of 0.7 or more.

22. The polymer composition of claim 1, in which the branched crystalline polypropylene has a melt flow rate of 1.0 or more.

23. The polymer composition of claim 1, in which the branched crystalline polypropylene has a melt flow rate of 1.5 or more.

* * * * *